(12) United States Patent
Tsuneta et al.

(10) Patent No.: US 8,442,300 B2
(45) Date of Patent: May 14, 2013

(54) SPECIFIED POSITION IDENTIFYING METHOD AND SPECIFIED POSITION MEASURING APPARATUS

(75) Inventors: Ruriko Tsuneta, Fuchu (JP); Tohru Ando, Tokyo (JP); Junzo Azuma, Hitachiota (JP)

(73) Assignee: Hitachi High-Technologies Corporation, Tokyo (JP)

( * ) Notice: Subject to any disclaimer, the term of this patent is extended or adjusted under 35 U.S.C. 154(b) by 1340 days.

(21) Appl. No.: 11/703,661

(22) Filed: Feb. 8, 2007

(65) Prior Publication Data

US 2007/0274593 A1 Nov. 29, 2007

(30) Foreign Application Priority Data

Mar. 28, 2006 (JP) ................................. 2006-086857
Dec. 26, 2006 (JP) ................................. 2006-348745

(51) Int. Cl.
*G06K 9/00* (2006.01)
(52) U.S. Cl.
USPC ........... 382/145; 382/141; 382/144; 382/159; 382/181; 356/237.4; 356/237.5; 250/310; 250/311; 250/306
(58) Field of Classification Search .................. 382/192, 382/141, 144, 145, 149; 356/237.4, 237.5; 250/310, 311, 306
See application file for complete search history.

(56) References Cited

U.S. PATENT DOCUMENTS

| 5,933,522 A | 8/1999 | Sugimoto | |
| 6,411,377 B1 * | 6/2002 | Noguchi et al. | ........... 356/237.4 |
| 6,566,654 B1 | 5/2003 | Funatsu et al. | |

FOREIGN PATENT DOCUMENTS

| JP | 10-92883 | 4/1998 |
| JP | 11-257939 | 9/1999 |
| JP | 200-195458 A | 7/2000 |
| JP | 2000-251824 | 9/2000 |
| JP | 2001-127125 A | 5/2001 |
| JP | 2003-98116 A | 4/2003 |
| JP | 2004-279244 A | 10/2004 |
| JP | 2005-222882 A | 8/2005 |
| WO | 2004/083901 A2 | 9/2004 |

OTHER PUBLICATIONS

Maruyama, the english version of JP11-257939, which was translated by machine, 1999.*

* cited by examiner

*Primary Examiner* — Kathleen Y Dulaney
*Assistant Examiner* — Ruiping Li
(74) *Attorney, Agent, or Firm* — Mattingly & Malur, PC

(57) ABSTRACT

A specified position in an array structure in which a reference pattern is displayed repetitively through reference pattern counting is identified. In an array structure image, the pattern detection estimating area generated from a starting point, the address of the starting point, and a unit vector are compared with a pattern detected position found in pattern matching with the reference pattern image, to execute pattern counting while determining correct detection, oversights, wrong detection, etc. Array structure images are photographed sequentially while moving the visual field with the use of an image shifting deflector to continue the pattern counting started at the starting point to identify the ending point specified with an address. If the ending point is not reached only with use of the image shifting deflector, the visual field moving range of the image shifting deflector is moved with use of a specimen stage.

9 Claims, 21 Drawing Sheets

SPECIFIED POSITION IDENTIFYING METHOD AND SPECIFIED POSITION MEASURING APPARATUS

CLAIM OF PRIORITY

The present application claims priority from Japanese application JP 2006-086857 filed on Mar. 28, 2006, the content of which is hereby incorporated by reference into this application.

FIELD OF THE INVENTION

The present invention relates to a technique for searching a pattern corresponding to a specified address in a charged particle apparatus with respect to a specimen having a structure in which similar patterns are disposed repetitively.

BACKGROUND OF THE INVENTION

What is important in semiconductor device manufacturing processes is a technique for detecting non-confirming or defective articles in semiconductor devices and analyzes the causes. There are some inspection apparatuses used for detecting such defects; for example, inspection apparatuses for electrical characteristics of circuits, external view checking apparatuses for inspecting foreign matters existing in wiring patterns, improper shapes of wiring patterns, etc. In those inspection apparatuses, defects to be subjected to defect cause analysis are picked up first, then positional information of each specified defect on the subject specimen is sent to an analyzer, in which electrical characteristics, compositions, and cross sectional shapes of the specified defect are observed.

Usually, the position setting accuracy of a specimen stage used for each of such inspection apparatuses is several micrometers. In recent years, wiring patterns of semiconductor devices are formed very finely. For example, the size of a memory cell block of a memory device mass-produced in these days is about several hundreds of nanometers. Consequently, it is difficult to report coordinate information of a defect detected in an inspection apparatus to another with required accuracy only with the positional control information of the specimen stage of the inspection apparatus.

Each of wiring patterns and circuit patterns in many semiconductor devices has an array structure in which similarly structured cells are disposed regularly according to their design data. The design data can be used as CAD data in various measuring and inspection apparatuses. In case where a defect detected in an inspection apparatus is to be analyzed in any of various other analyzing apparatuses, in addition to the coordinate information of the defect obtained in the inspection apparatus, the information of the defect position on the design data is also obtained from the CAD data. Each of the analyzing apparatuses selects an appropriate reference position as a starting point on the subject specimen and executes matching with the reference position to know where is the reference position on the CAD data and how far the target position of the analysis is away from the reference position. Such a reference position is selected from, for example, an edge of an array structure of a semiconductor device. At this time, the analyzer counts the number of cells from a given starting point to an ending point up to reach the ending point. And pattern measurement (cell counting) is needed at this time to measure how often a predetermined pattern appears between the starting point and the ending point. In case where the number of patterns is comparatively less, the operator can count the number of patterns at a visual check. In the case of a device having several hundreds or several thousands of cells, it is strongly required to make pattern counting automatically.

JP-A No. 92883/10 discloses a technique for obtaining an image of a target position with use of an optical photograph, an electron microscope, or the like to count the number of memory cells on a memory LSI from changes of the brightness or luminosity of the image with use of a pattern recognition device. The pattern recognition device holds the ending point of cell counting as a physical address and ends the memory cell counting when the number of counted memory cells matches with the value indicated in the physical address. The pattern recognition device determines the counting ended position as a logical address, which is coordinates on the design plan of the memory LSI.

JP-A No. 251824/2000 discloses an invention in which the visual field of a SEM image is moved while stage moving vectors are detected in a range from a starting point of cell counting to a target point. When the stage moving distance reaches a predetermined electron beam deflection limit, the stage is stopped once. Then, the number of cells disposed in the visual field of the observation is extracted at that position. And according to the extracted data, a mutual positional relationship between a disposed cell and another is identified and the visual field of the SEM image is moved again. By repeating such movements in many steps, the specified cell is moved in the visual field of the SEM image. A specimen stage moving vector is obtained by specifying a cell as an index basic pattern and from a relative movement of the index basic pattern in the visual field of the SEM image before and after the specimen stage movement. The relative movement of the index basic pattern in the visual field of the SEM image is obtained from a differential image of the SEM images before and after the specimen stage movement.

[Patent document 1] JP-A No. 092883/10
[Patent document 2] JP-A No. 251824/2000

SUMMARY OF THE INVENTION

Hereunder, a description will be made for problems of conventional cell counting with reference to FIG. 1. FIG. 1 shows an explanatory diagram for an image of a semiconductor device observed through a microscope. On the semiconductor device are disposed a plurality of plugs regularly. Each circle denotes a plug. In the case of the conventional cell counting, pattern matching is executed while moving a proper reference pattern 100 at given pitches in the whole area enclosed by edges 101 and 102 of an area in which cell counting is made. The number of areas matching with the reference pattern is counted in the cell counting. It is premised that the cells to be counted are disposed like a matrix when in setting a reference pattern.

Actually however, memory cells are not always disposed like a square matrix; cells are often disposed in a complicated pattern. For example, they might be disposed obliquely and a plurality of patterns might be disposed in a nested structure. If cell counting is made for such a complicated pattern with any of the conventional cell counting and bit counting techniques, the pattern matching becomes complicated and the computer used for such cell counting or bit counting comes to be much loaded. This has been a problem. And in the case of the conventional cell counting, pattern matching must be done in the whole area that includes both starting and ending points. And if the starting and ending points are far separated from each other, the number of cells to be counted increases, thereby the computer load increases after all.

Under such circumstances, it is an object of the present invention to solve those conventional problems by employing a concept of unit vector when in cell counting/bit counting and enabling the pattern repeating unit to be set freely according to the specimen to be subjected to cell/bit counting. The "unit vector" mentioned here is a specified unit of a coordinate system for representing addresses of both starting and ending points when in cell counting. The unit vector has a size and a direction. That is why it is referred to as a unit vector in this specification. Hereunder, the unit vector will be described with reference to FIG. 2.

FIG. 2 is an expanded explanatory diagram of part of a semiconductor device plug formed plane. Each circle denotes a plug. The (a, b) denotes a unit vector, which is used in cell counting.

If a unit vector is changed, the address of the cell represented as the unit vector is also changed. For example, if a unit vector is selected as (a, b) shown in FIG. 2A, the ending point address is represented as (4, 3). Here, the positive/negative of the coordinate axis is defined so that the directions of the arrows a and b are positive and the opposite directions of those arrows are negative. On the other hand, if a unit vector is selected as shown in FIG. 2B, the ending point is represented as (4, 6).

In the case of the present invention, a detection estimating area is set according to such a unit vector. A detection estimating area means an area in which a target pattern is expected to exist. A detection estimating area is set as an area of which center is separated by an integer multiple of a unit vector from the starting point. Each detection estimating area is given an address corresponding to an integer multiple of the unit vector. A pattern detected in such a detection estimating area is determined as a cell in the address.

If a pattern is detected in a detection estimating area, it is referred to as correct detection. If a pattern is detected outside a detection estimating area is referred to as wrong detection. If no pattern is detected in a detection estimating area, it is referred to as an oversight. Information of those positions is recorded. Position information of both recorded wrong detection and an oversight is analyzed to correct an error occurred when in pattern matching.

Because the concept of the unit vector is employed when in cell counting/bit counting and the apparatus user can set a pattern repeating unit freely as described above, the following effects are available. One of the effects is reduction of the cell counting/bit counting time. Pattern matching executed only in a detection estimating area can reduce the pattern matching time much more than pattern matching executed in the whole area between starting and ending points. Furthermore, because pattern matching is done only in a detection estimating area overlapping with an additional line shown in FIG. 2 without detecting all the cells, the pattern matching time can be reduced much more. The other of the effects is that a pattern matching result determination function can be added to the apparatus. And a pattern detected position is compared with a detection estimating area to extract oversights and wrong detection, thereby it is determined whether or not pattern counting is done as specified. Consequently, the accuracy for identifying an ending point, that is, a defect position, is improved significantly.

Thus each defect position on a semiconductor device, detected by an inspection apparatus or the like, has come to be identified very accurately, quickly, and stably in another apparatus such as an analyzer or the like.

DETAILED DESCRIPTION OF THE PREFERRED EMBODIMENTS

First Embodiment

In this first embodiment, a description will be made for the basic concept of cell counting or bit counting with use of unit vectors with reference the accompanying drawings.

Figure 1:
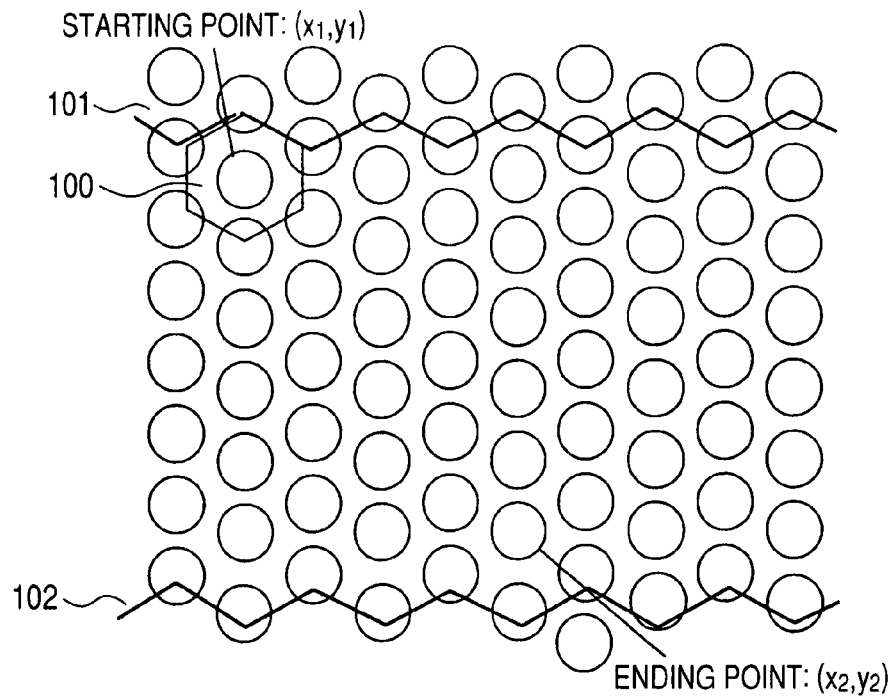
FIG. 1 is a diagram for describing problems of a conventional cell counting method.
Figure 2A:
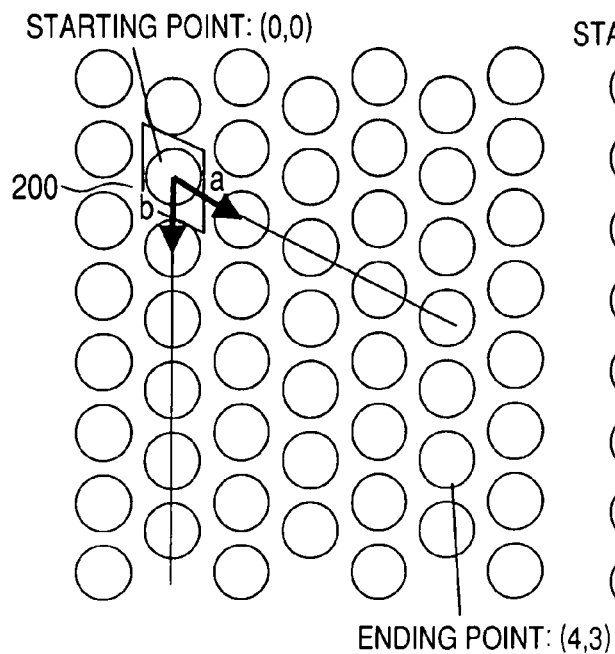
FIG. 2 is a diagram for describing a unit vector.
Figure 2B:
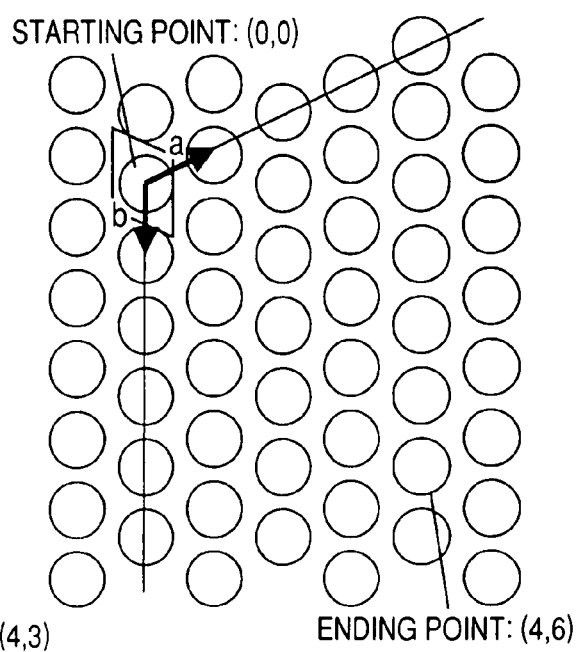
Figure 3:
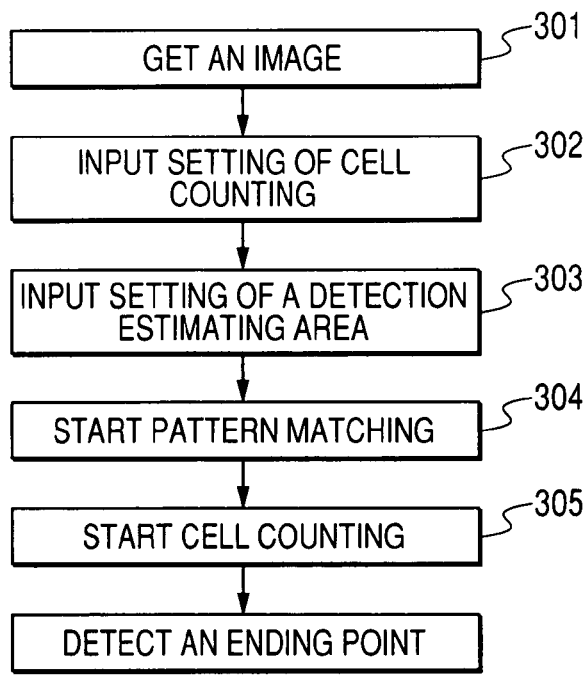
FIG. 3 is a basic flowchart of a cell counting method in a first embodiment.

FIG. 3 is a basic flowchart of the cell counting in this first embodiment. At first, in step 301, an image at a target position of cell counting is obtained and displayed on a screen. The image may be, for example, any of an electron beam image such as SEM, TEM, etc., as well as an optical microscope image, etc. that may be obtained by any method. Typically, an image to be obtained here is a semiconductor specimen as shown in FIGS. 2A and 2B.

In next step 302, necessary cell counting information is set/inputted. The "counting information" mentioned here means information including a starting point of a position (0, 0), an address of an ending point, unit vectors, and a reference pattern, which are all needed for cell counting. In this first embodiment, the apparatus user is premised to input all those information items. After the processing in step 302, a display screen, for example, as shown in FIG. 2A appears. On the screen is displayed the unit vectors a and b, the starting point, the ending point, and the graphic information 200 of the reference pattern for pattern matching. The straight lines displayed on the unit vectors a and b are additional ones; they may be omitted in principle. However, if they exit, the visibility is improved for selecting unit vectors optimal to a displayed cell pattern.

In the next step 303, a detection estimating area is set. A detection estimating area means an area in which a pattern to be detected is expected to exist. Using such a unit vector, a detection estimating area can be set as an area of which center is assumed to be a point separated from the starting point by an integer multiple of the unit vector. An address corresponding to an integer multiple of the unit vector is given to each detection estimating area. The size of each detection estimating area is necessarily to be set greater than precision of the pattern matching, and less than the size of the unit vector. If pattern matching is carried out only in such a detection estimating area, the pattern matching time is reduced. If pattern matching is done only in a detection estimating area, for example, only in a detection estimating area overlapping with the additional lines shown in FIG. 2, the pattern matching time can be much more reduced. A detection estimating area is set with use of, for example, a method for specifying each edge point of the detection estimating area displayed on the screen with a mouse. It is also possible to input the coordinate information of each edge point, but it would be more easier to set/input the information on the GUI. The user is not always requested to input the limit of such a detection estimating area; the apparatus is enabled to set the area automatically according to a predetermined value.

Figure 4:
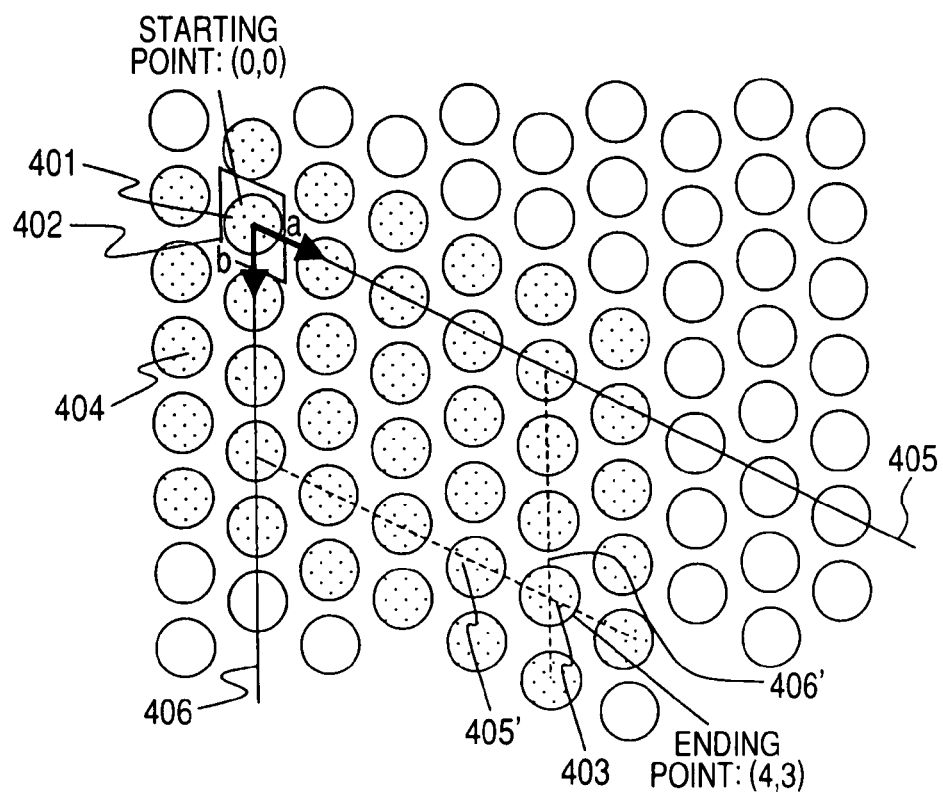
FIG. 4 is an example of an image displayed on a screen after the flowchart shown in FIG. 3 ends.

FIG. 4 shows an SEM image displayed on a screen after the processing in step 303 shown in FIG. 3 is executed. Each white or hatched circle denotes a cell. Reference numeral 401 denotes the starting point for cell counting. The a and b denote set unit vectors. The square 402 means a reference pattern for pattern matching. This time, a hatched detection estimating area is selected from among those generated from a starting point and unit vectors respectively. In other words, the detection estimating area consists of cells in an area enclosed by the additional lines 405 and 406, as well as by the additional lines 405' and 406' passing the ending point (4,3), and their adjacent cells.

In step 304 shown in FIG. 3, pattern matching is executed according to the set information. In the detection estimating area, a position where the highest consistency degree is recognized is searched according to the reference pattern and it is identified as a target detected pattern position.

In step 305 shown in FIG. 3, cell counting is executed. Correctly detected cells are extracted as a result of comparison between the detected pattern position and the detection estimating area. Then, the extracted cells are counted and the ending point cell is identified.

Next, a description will be made for an embodiment in which cell counting is done for a more complicated pattern. Depending on the specimen, a pattern for which cell counting is to be made may be cluster-structured or nest-structured; it may not be simple as shown in FIG. 4.

Figure 5A:
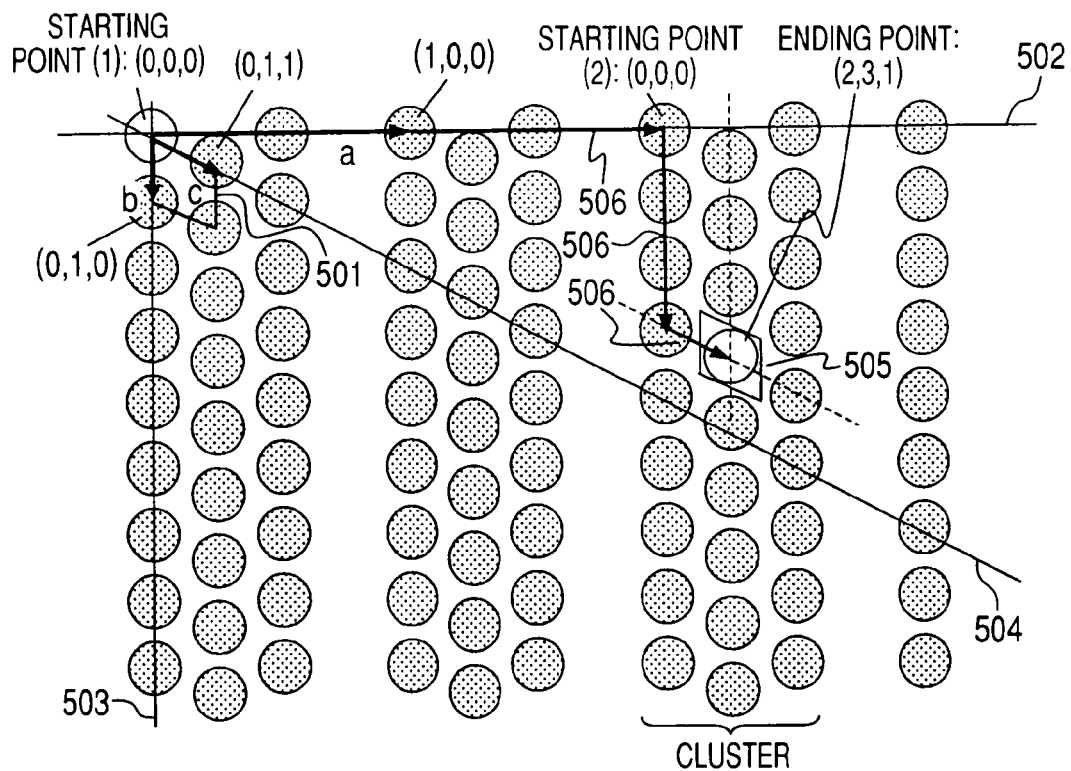
FIG. 5 is an explanatory diagram for showing a specimen having a complicated pattern.

FIG. 5A shows an explanatory view of a cluster-structured pattern. A cluster mentioned here means a pattern in which a plurality of cells are collected to form a specific pattern and such specific patterns are disposed cyclically and repetitively. In such a cluster-structured pattern, two unit vectors are specified, that is, one unit vector a for representing a cluster cycle and the other unit vector (b, c) for representing the patterns in a cluster. In this case, the coordinates of each pattern shown in FIG. 5A can be represented by (a, b, c). For example, in a cluster that includes a starting point (1), an adjacent cell in the direction of the unit vector b is represented as (0,1,0) and an adjacent cell in the direction of the unit vector c is represented as (0,0,1) with respect to the starting point (1)(0,0,0) respectively.

When executing cell counting during pattern matching, at first the counting advances in the direction of the additional line 502 (that is, vector a). When the predetermined number of cells are counted, the cluster unit cell counting is ended. Information that how many cells are counted in the direction of the unit vector a is calculated from both the information of the ending point on the CAD data and the size of the set unit vector a. Then, a proper starting point in the reached cluster (e.g., the starting point (2) shown in FIG. 5A) and the detection estimating area 505 are set. Then, cell counting is executed in a cluster starting at the starting point set as a base point. Cell counting in the cluster is executed along the additional lines 503 and 504 and the ending point (2,3,1) is detected finally. The cell counting route from the starting point (1)(0,0,0) to the ending point (2,3,1) is shown with an arrow 506. In the above description, only one unit vector is used to specify the cycle of clusters. It is also possible to execute cell counting by specifying the reference pattern of the cluster itself. In such a case, it is just required to specify a cluster reference pattern with a unit vector (a,b) and to specify a position in the cluster with a unit vector (c,d), etc.

Figure 5B:
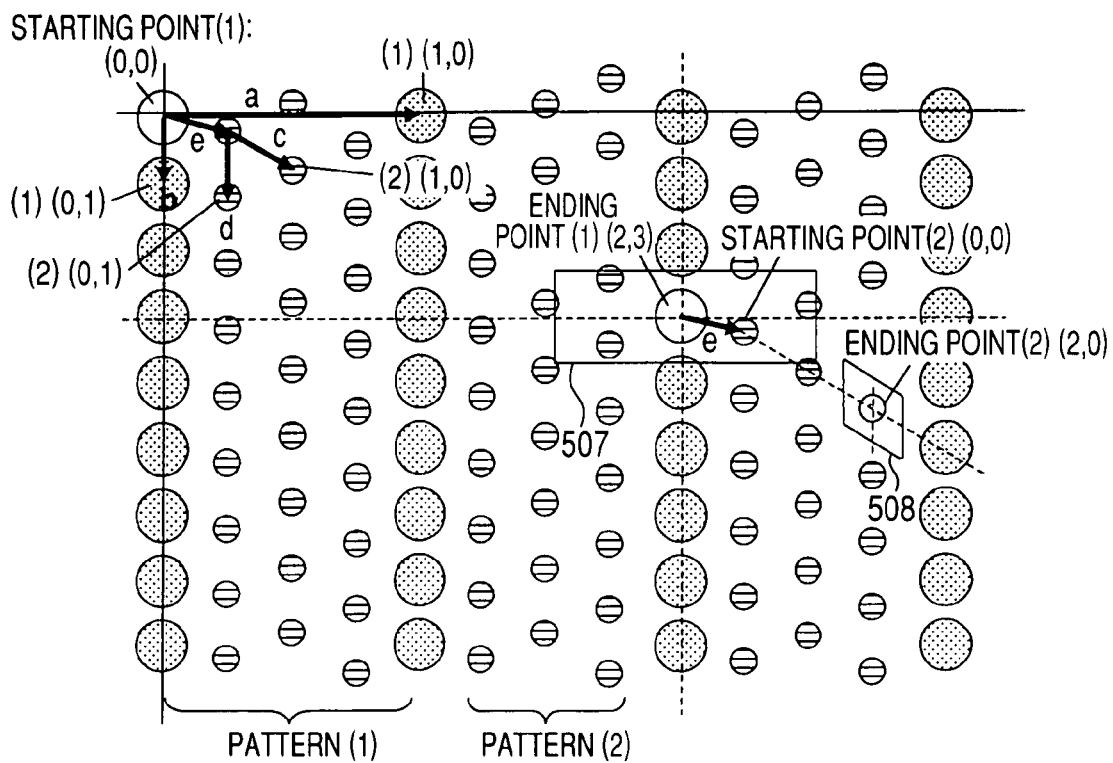

FIG. 5B shows an explanatory view of a nested structure of two types of patterns (1) and (2) in which cell counting is to be made. In this case, two types of unit vectors (a,b) and (c,d), as well as a relative position vector e between reference patterns are just inputted to represent nested patterns. When executing cell counting actually in such a case, at first a proper detection estimating area 501 is set according to the specified unit vector (a,b), then cell counting is executed while moving the reference pattern in the directions of the horizontal and vertical additional lines from the starting point (1)(0,0) to the detection estimating area. Here, the additional line with respect to the pattern (1) is shown with a solid line. When the detection estimating area 501 is reached, pattern matching with the reference pattern is executed to detect the ending point of the pattern (1). If the detected ending point (ending point (2)(2,3)) is proper, a position specified by the relative unit vector e from the ending point of the pattern (1) is set as the starting point (2)(0,0) of the pattern (2). Then, according to the unit vector (c,d) and the ending point (1) on the CAD data, the detection estimating area 502 is set for the pattern (2). Just like the pattern (1), cell counting is executed at the starting point (2)(0,0) and when the detection estimating area is reached, the ending point is detected. This completes the description of an example for specifying unit vectors to enable representing a complicated structure pattern, as well. As a specimen having such a complicated pattern, for example, there are a microcomputer, a logic system semiconductor device, etc.

Although not illustrated, if image obtaining means, image displaying means for displaying the image obtaining means, calculating means for executing a flow shown in FIG. 2 for image information obtained by the image obtaining means, information inputting means for transmitting information required for calculation to the calculating means or storage means for storing such information, etc. are provided for any of inspection apparatuses, the apparatus will come to be able to execute cell counting as described in this embodiment.

Thus the cell counting method in this embodiment can realize cell counting with less load of the computer more easily and accurately than any of the conventional methods.

Second Embodiment

Figure 6:
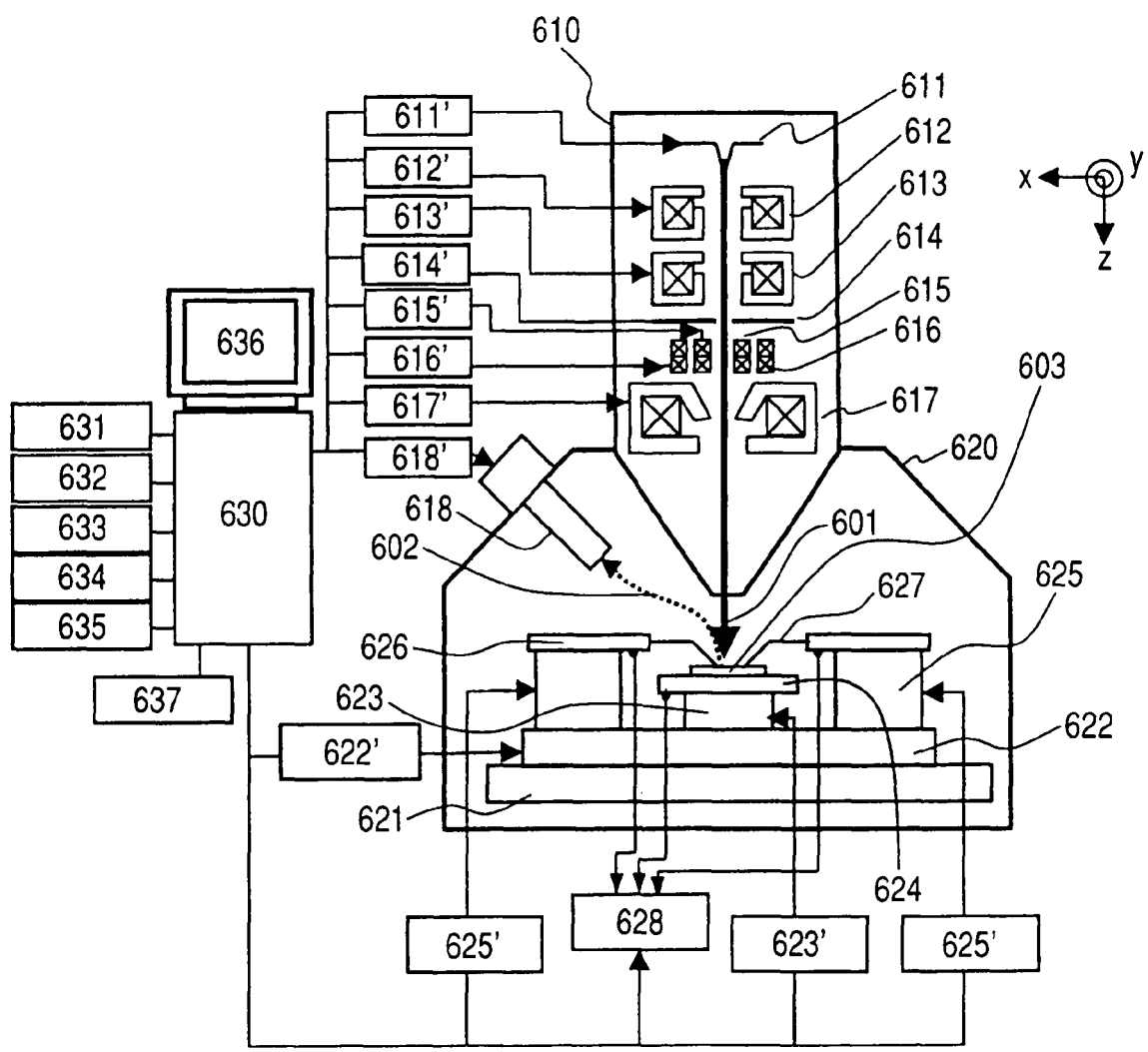
FIG. 6 is an overall configuration of a charged particle beam apparatus in a second embodiment.

In this second embodiment, a description will be made for a configuration of a probe contact type electrical characteristics evaluation system (Nano-Prober: trade mark)) to which the cell counting method described in the first embodiment is applied. FIG. 6 shows an overall block diagram of the nano-prober. The "nano-prober" mentioned here is an electrical characteristics evaluation system capable of measuring the electrical characteristics of each finely formed circuit pattern at a nano-scale. The nano-prober contacts a minute probe directly to an object circuit pattern to measure its electrical characteristics. Consequently, when putting a probe in contact with a target point of the specimen, the probing position is searched by cell counting, thereby the system operability is improved. In the following description, a "probe" means a mechanical probe.

At first, a description will be made for an electron optical system used to observe a specimen 603 to be inspected for defects. The electron optical system is composed of an illuminating optical system 610 for illuminating and scanning a primary electron beam 601 on the specimen 603 and a focusing optical system for detecting secondary charged particles generated by electron beam illumination. The illuminating optical system 610 is composed of an electron gun 611 for generating a primary electron beam, condenser lenses 612 and 613 for forming a primary electron beam respectively, a primary electron beam opening angle limiting iris 614 for limiting an opening angle of the primary electron beam, a scanning deflector 615 for scanning the primary electron beam on the specimen 603, an image shifting deflector 616 for changing the position of the primary electron beam on the specimen 603, and an objective lens 617 for focusing the primary electron beam onto the specimen 603. The secondary electrons 602 generated from the specimen 603 illuminated by the primary electron beam 601 is detected by the secondary electron detector 618, etc. And a scanning signal sent to the scanning deflector 615 is synchronized with a secondary electron beam detection signal detected by the secondary electron detector 618 to obtain a secondary electron image of the specimen 603.

Next, the driving systems will be described. The specimen 603 is held on a specimen pedestal 624 and the specimen pedestal 624 is held by specimen pedestal driving means 623. The combination of the specimen pedestal 603 and the specimen pedestal driving means 623 is referred to as a DUT stage. The probe 627 used to measure the electrical characteristics of the specimen 603 is held by a probe attachment 626 and the probe attachment 626 is held by probe driving means 625. The DUT stage and the probe driving means 625 are formed on the large stage 622 respectively. The large stage 622 is provided with driving means in x and y directions (in-plane) and in a z direction (perpendicular), thereby the large stage 622 can drive both the DUT stage and the probe driving means 625 unitarily. The large stage 622 is also disposed on the base 621. Those driving systems are disposed in a vacuum chamber partition 620 and drive object devices in a vacuum respectively.

Next, the electrical characteristics measuring system will be described. The specimen 603 is connected to an electrical characteristics measuring instrument 628 through the specimen pedestal 624 and the probe 627 is connected to the electrical characteristics measuring instrument 628 through an attachment 626 respectively. The probe 627 is put in contact with the specimen 603 to measure the current-voltage characteristic thereof to calculate a desired characteristic value from the measurement result. For example, the electrical characteristics measuring instrument 628 calculates the resistance value, current value, voltage value, etc. at the contact point of the probe 627. In the case of an analysis of a semiconductor wafer, for example, a semiconductor parameter analyzer is used as an electrical characteristics measuring instrument 628. The measurement result of the electrical characteristics measuring instrument 628 is sent to a control computer 630 and used for still higher analysis.

Next, the control system will be described. The control system controls the electrical optical systems and driving systems. The control system is composed of an electron gun control power supply 611' for supplying a driving voltage to the electron gun 611, a condenser lens 612' for supplying a driving voltage to the condenser lens 612, an iris control unit 614' for controlling an aperture diameter of the iris 614, a deflector control unit 615' for supplying a scanning signal to the scanning deflector 615, an image shifting deflector control power supply 616' for supplying a deflection signal to the image shifting deflector 616, an objective lens control power supply 617' for supplying a driving voltage to the objective lens 617, a secondary electron detector control unit 618' for turning on/off the transmission of the detection signal detected by the secondary electron detector to the control computer 630, a large stage controlling means 622' for transmitting a position control signal to the large stage 622, a specimen pedestal driving means 623' for transmitting a position control signal to the specimen pedestal driving means 623, and a probe driving means controlling means 625' for transmitting a control signal to the probe driving means 625.

The control computer 630 controls the whole defect analyzing apparatus. Consequently, the control computer 630 is connected to all of the electron gun control power supply 611', the condenser lens 612', the iris 614', the deflector control unit 615', the image shifting deflector control power supply 616', the objective lens control power supply 617', the secondary electron detector control unit 618', the large stage controlling means 622', the specimen pedestal driving means 623', and the probe driving means controlling means 625'. The control computer 630 also includes storage means 635 for storing software for controlling each connected component, a user interface 637 for inputting setting parameters of the apparatus, and a display device 636 for displaying various operation screens and SEM images. In addition, the control computer 630 also includes a plurality of image processing units 631 to 633 and a CAD navigation system 634 for storing wiring layout data (hereunder, to be referred to as CAD image data) of each target specimen and outputting the wiring layout data according to appropriate reference information.

Next, a description will be made for how cell counting is executed in the apparatus shown in FIG. 6.

Figure 7:
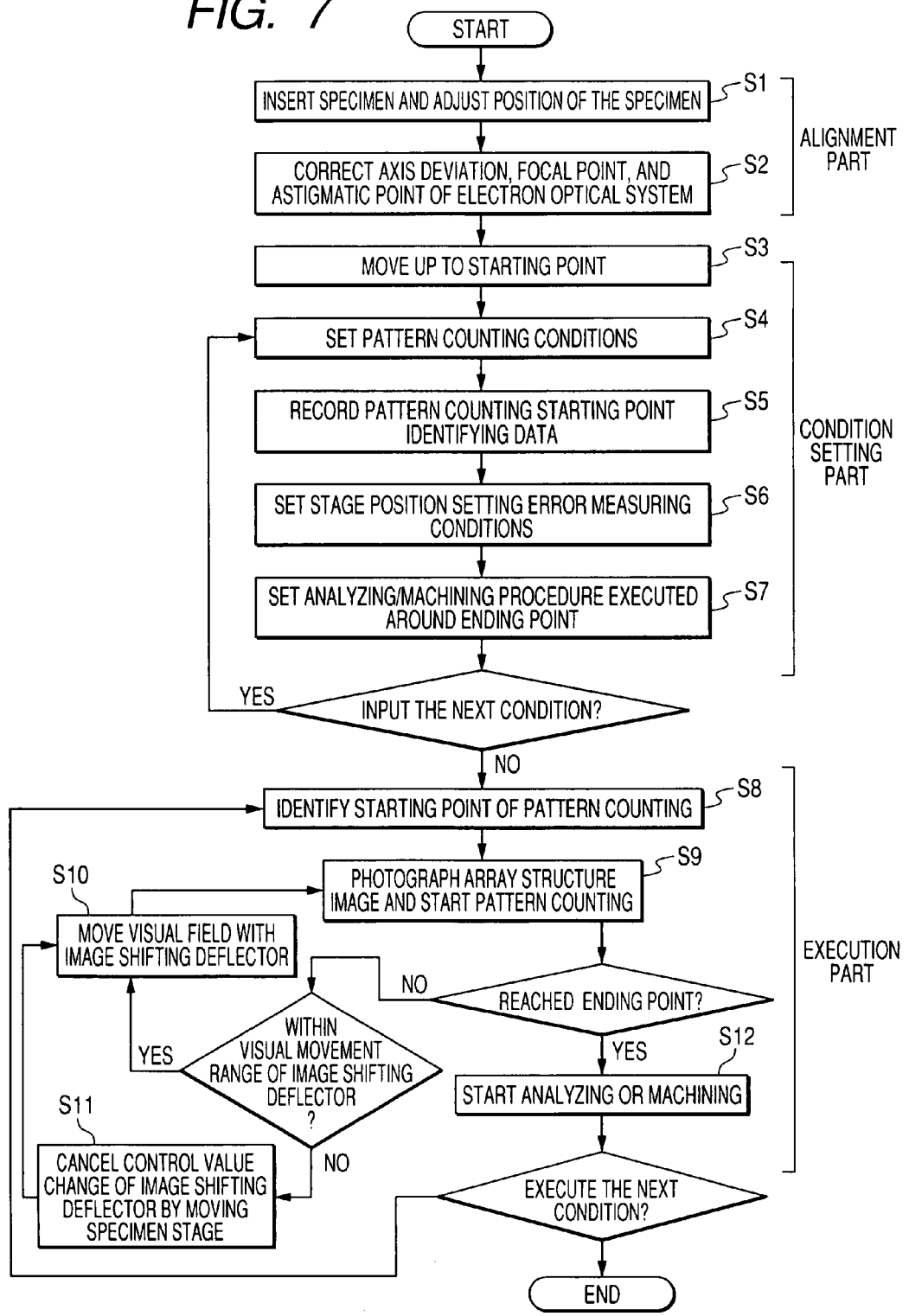
FIG. 7 is an overall flowchart of the operation of the charged particle beam apparatus in the second embodiment.

At first, the overall flowchart shown in FIG. 7 will be described. The flowchart shown in FIG. 7 is divided roughly into three sub-flows; an alignment flow, a condition setting flow, and an execution flow.

The alignment flow is a flow for adjusting the optical axis of the electrical optical system. The alignment flow consists of two steps; step 1 for inserting a specimen in the analyzing apparatus and adjusting the position of the specimen in a mirror body with use of the specimen stage while observing the SEM image and step 2 for correcting the axis deviation, astigmatic point, and focal point of the electrical optical system while observing the SEM image. After the alignment process, the condition setting flow begins.

The condition setting flow is a flow for setting conditions required for subject cell counting. In step 3, the DUT state or large stage 622 is driven to move the subject specimen so that a desired area including a starting point of cell counting is included in the visual field of the SEM image. In step 4, the following items are set; photographing conditions for an array structure image used for pattern counting, a reference pattern image, a positional information of a starting point (0,0), unit vectors, and an address of an ending point (step 4). The positional information of the starting point and the address of the starting point may be set on the wiring layout supplied from the CAD navigation system or may be set on the SEM image actually obtained through the user interface 637. After that, data required for identifying the starting point of pattern counting is recorded (step 5). Then, photographing conditions for an array structure image used for measuring stage position setting errors, as well as an analyzable positional deviation are set (step 6). Then, an address of the ending point and the procedure of analyzing or machining to be performed around the ending point are set (step 7).

The condition setting flow is exited when the processings in steps 3 through 7 are completed. After inputting the necessary number of conditions, control goes to the execution flow. At first, the conditions inputted in step 5 are called to identify a starting point of pattern counting (step 8). Then, the conditions inputted in step 4 are called to execute pattern counting (step 9). The visual field is moved with use of the image shifting deflector until the ending point is reached to photograph array structure images sequentially (step 10). The pattern counting is still continued. If the moving range of the image shifting deflector is exceeded, the specimen stage is moved to cancel the control value change of the image shifting deflector (step 11), then the visual field movement is continued by image shifting. When the ending point is reached, the conditions inputted in step 7 are called to perform the specified analyzing or machining (step 12). The execution flow is exited when the processings in steps 8 through 12 are completed. When all the inputted conditions are executed, the flow processings are ended.

Figure 8:
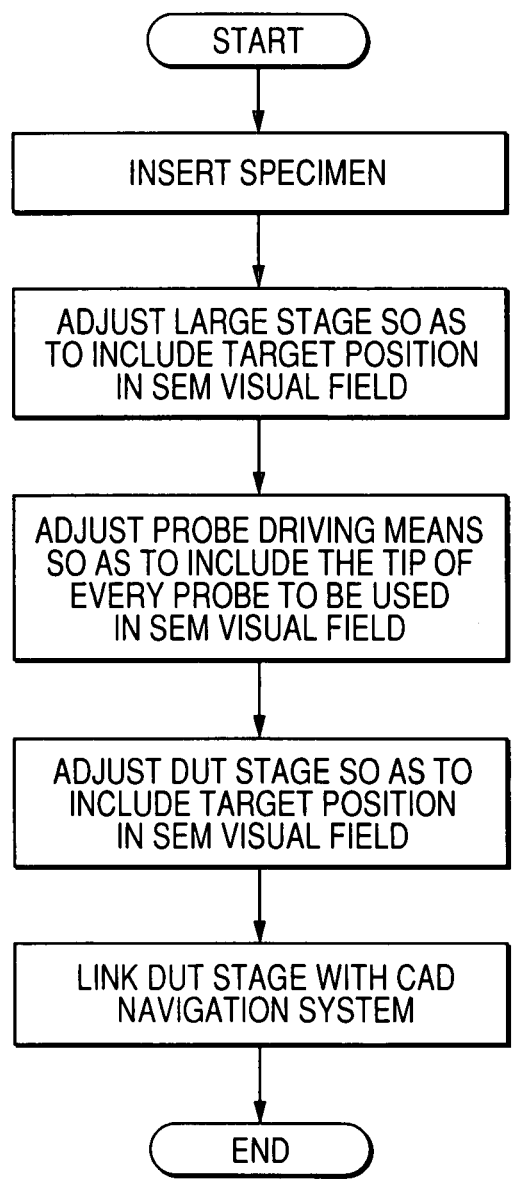
FIG. 8 is a detailed flowchart of a specimen position adjusting process in the overall flowchart shown in FIG. 7.

Next, the details of each step described above will be described. At first, the specimen position adjusting process in step 1 will be described with reference to FIG. 8. A specimen 603 is put first on the specimen pedestal 624, then the specimen 603 is inserted into the specimen chamber with use of the large stage 622. The specimen 603 is then checked with a low magnification SEM image to adjust the position of the large stage 622 with respect to the optical axis of the electron beam illumination system 610. When adjusting the position of the large stage 622, the control values of the probe driving means 625, the specimen pedestal moving means, the image shifting deflector, etc. should be reset beforehand. After that, the position of each probe is adjusted with respect to the optical axis of the electron beam illumination system 610. Then, the probe driving means 625 is adjusted so that all the probes to be used enter the SEM visual field, then the control values of the probe driving means 625 are recorded. After that, the position of the specimen 603 is adjusted with use of the DUT stage with respect to the optical axis of the electron beam illumination system 610. At that time, the DUT stage control system 623' is linked with the CAD navigation system 634. Each of the latest inspection/analyzing apparatuses is provided with a CAD navigation system in which a device structured layout data (CAD data) is stored. If the user inputs information of an observation point in the CAD navigation system, the specimen stage is controlled to display a SEM image including the observation point. To use this system, it is required to use a plurality of alignment marks disposed on the specimen 603 to correct the position setting error when the specimen 603 is put on the specimen pedestal 624.

In step 2, the electron optical system is adjusted by controlling the DUT stage so that the electron optical system adjusting pattern is included in the SEM image while observing the adjusting pattern. Those adjustments may also be done automatically with use of control software. The adjustments may be done during the processing in step 1.

In step 3, the specimen is moved with use of the CAD navigation system. At first, the starting point is inputted on the CAD data, then the DUT stage is controlled so that the starting point may be included in the SEM visual field. If the apparatus cannot use any CAD navigation system, the user is requested to adjust the DUT stage and move the DUT stage up to a position in which the starting point is included in the SEM visual field. In that case, the DUT stage should be moved so as to include the starting point at the top left of the SEM image visual field to obtain better visibility.

Figure 9:
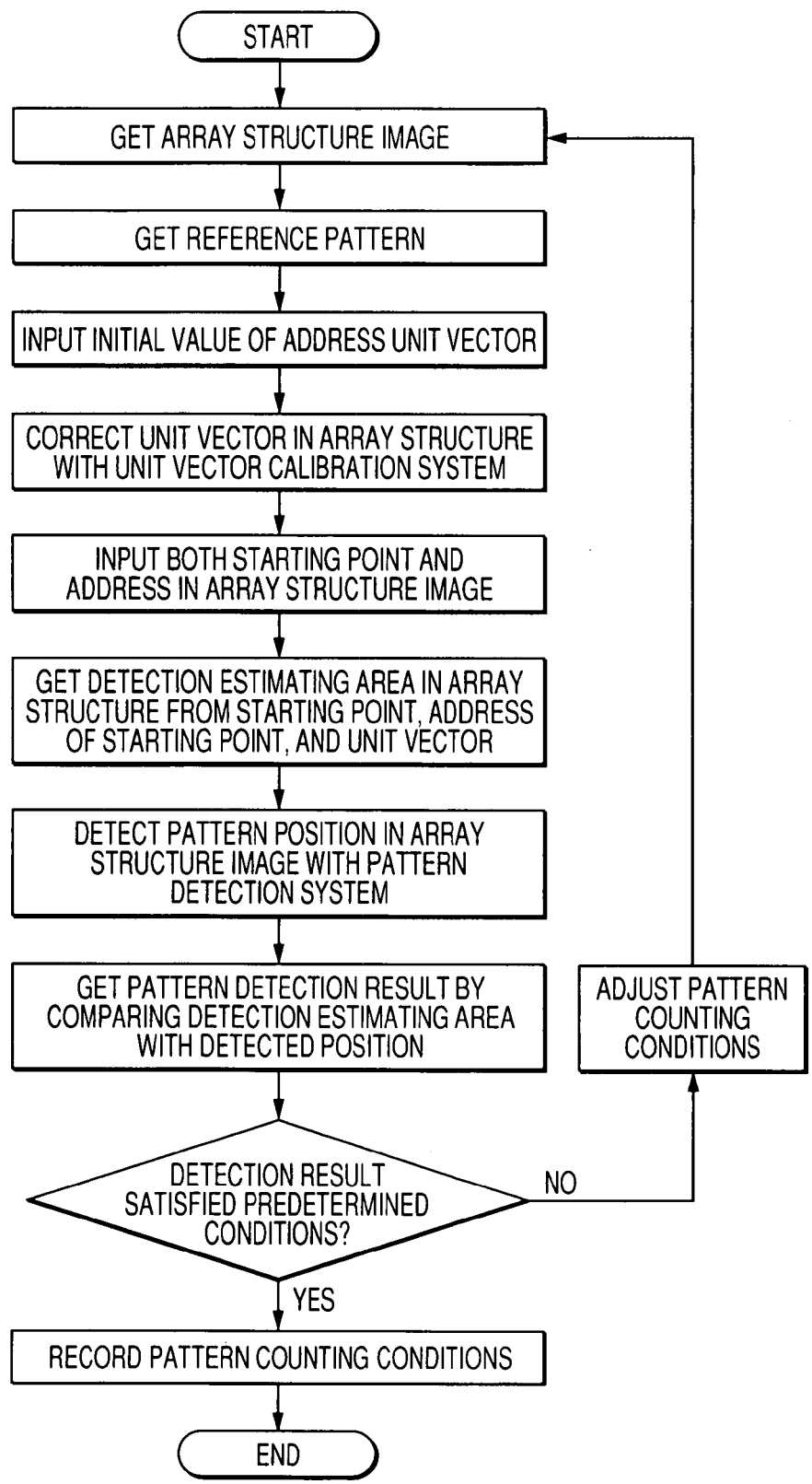
FIG. 9 is a detailed flowchart of the pattern counting condition setting step in the overall flowchart shown in FIG. 7.

Next, a description will be made for the details of step 4 (conditions setting for pattern counting) shown in FIG. 7 with reference to FIG. 9. At first, an array structure image is photographed. A reference pattern may be created from the photographed array structure image or a reference pattern image recorded beforehand may also be called. After that, the unit vector initial value is inputted. The unit vector initial value may be specified while observing the subject array structure or a value calculated from both the CAD data and the photographing magnification of the array structure may be used as the initial value. The inputted initial value is corrected with use of a calibration system. The details of the calibration system will be described later in the fourth embodiment. Next, a starting point and the address of the starting point in the array structure are inputted to find a detection estimating area. After that, a reference pattern and an array structure image are inputted to the pattern detection system to detect the pattern position. Then, the detection estimating area is compared with the detected position to find such pattern detection results as correct detection, oversights, wrong detection, etc. If there are many oversights and wrong detection occurrence (over a predetermined threshold value), the frequency of the occurrence and its related information are displayed on a screen. A threshold value for determining whether to display such information is stored in the storage means 635 and the control computer 630 refers to the information. If the pattern detection results do not satisfy predetermined conditions, the pattern counting conditions are adjusted and they are verified again. If the detection results satisfy the predetermined conditions, the pattern counting conditions are recorded.

In step 5, data necessary for identifying the starting point of pattern counting is recorded. If an array structure image that includes the starting point of pattern counting is already photographed in step 4, the array structure image may be used. Finally, the coordinates of the starting point in the array structure image, the array structure image photographing conditions, the DUT stage control value, the image shifting deflector control value are recorded together with the array structure image.

Figure 10:
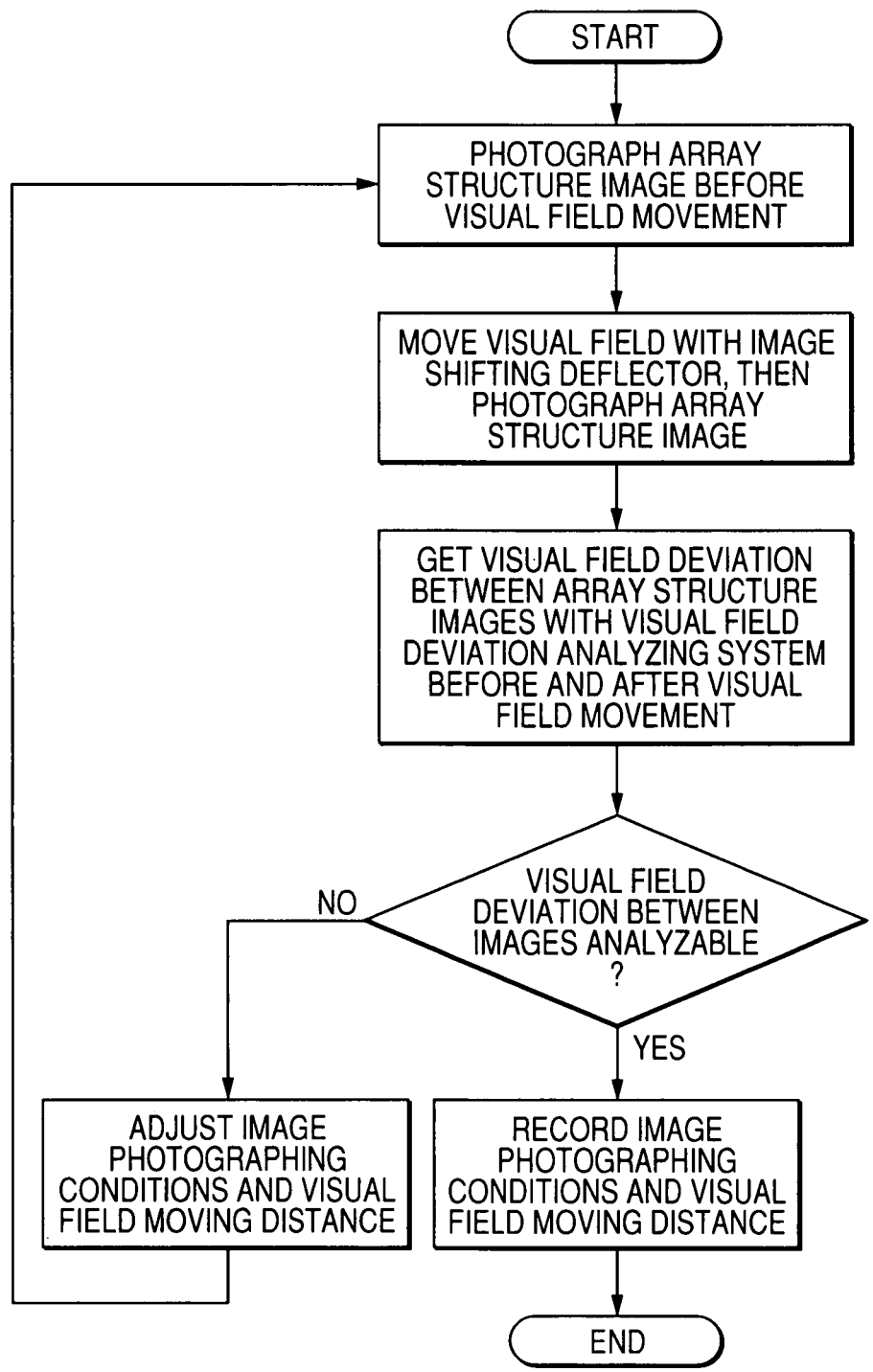
FIG. 10 is a detailed flowchart of the step 6 shown in FIG. 7.

In step 6, image photographing conditions used for measuring the stage position setting error and the analyzable visual field deviation are set. If there is a recipe, it is referred to, then both image photographing conditions and visual field moving distance are inputted. FIG. 10 shows a flowchart for verifying whether or not stage position setting error can be measured on the conditions. Then, the array structure image before the visual field movement is photographed. After moving the visual field with use of the image shifting deflector, the array structure image is photographed. Because the image shifting deflector is high in position setting accuracy, the visual field deviation, before and after the visual field movement, can be found from the control value of the image shifting deflector. Then, a pair of images for which the visual field deviation is already known is inputted to the analyzing apparatus and it is verified for whether or not the visual field deviation can be analyzed. If it is analyzable, both of the image photographing conditions and the visual field deviation are recorded. If not analyzable, the conditions are changed and they are verified again.

Figure 16A:
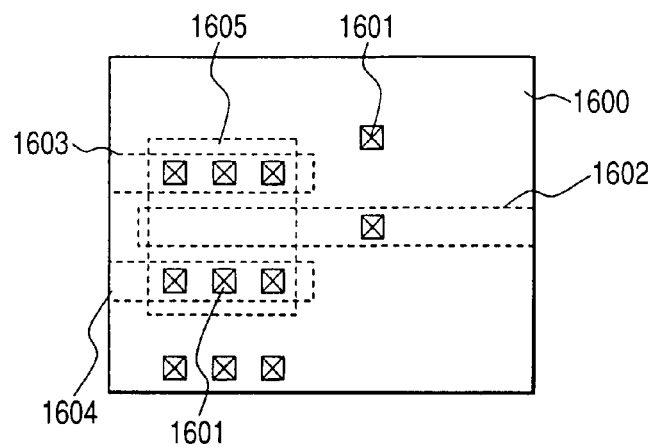
FIG. 16 is an example of an SEM image and a CAD image obtained by the charged particle beam application apparatus in the second embodiment.

In step 7, the address of the ending point, as well as the analyzing procedure to be executed around the ending point are inputted. In the case of an electrical characteristic evaluation apparatus that uses a mechanical probe, the point with which the probe is put in contact is specified and the electrical characteristics to be measured are inputted. When a probe is put in contact with a specimen, the CAD image is compared with the SEM image to do probing. FIG. 16A shows an example of a CAD image. Reference numerals 1600 and 1601 denote a wafer specimen and a plug respectively. An area enclosed with a dotted line is a wiring. In FIG. 16A, the wirings 1602 to 1604 in the horizontal direction are separated from the wiring 1605 in the vertical direction, which connects between wirings 1602 to 1604 in the horizontal direction. A plurality of plugs are formed on each wiring. Each wiring is embedded in the specimen and it cannot be observed from the SEM image. The probe is put in contact with the surface-exposed plug 1601 to measure the electrical characteristics to diagnose wire disconnection, etc. The wirings to be diagnosed are inputted to the CAD navigation system, then plugs to be measured are output. After that, a CAD image that include those plugs is displayed, then a position with which the probe is to be put in contact and the electrical characteristics measuring procedure are inputted on the CAD image. A plug assumed to be the ending point of cell counting is selected from the position with which the probe is put in contact or its adjacent plug. Here, the plug 1601 shown in FIG. 16A is selected as the ending point. Then, the ending point of pattern counting is calculated on the CAD data according to the starting point and the address of the starting point inputted in step 4, as well as the unit vector.

When the processings in steps 3 to 7 are completed, the condition setting flow is exited. If there is no need to input other conditions, the condition setting flow is also exited.

Figure 11:
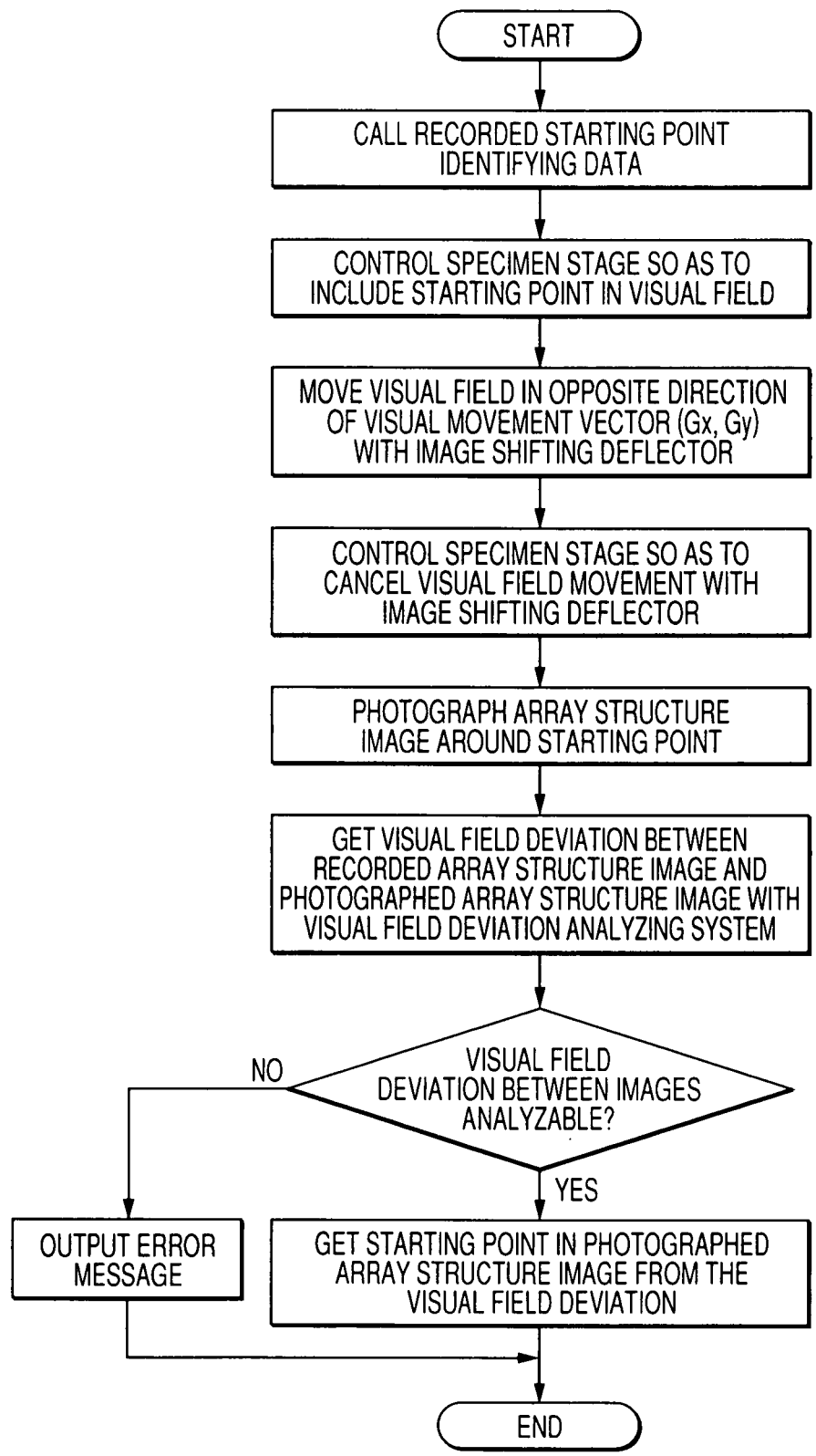
FIG. 11 is a detailed flowchart of the step 8 shown in FIG. 7.

Steps in and after step 8 are the execution process. At first, the conditions recorded in step 5 are called to control the specimen stage so as to include a starting point in the SEM image visual field. In step 8, a flow for adjusting both image shifting and the specimen stage shown in FIG. 11 is included. The detail of this step 8 will be described later.

Figure 13:
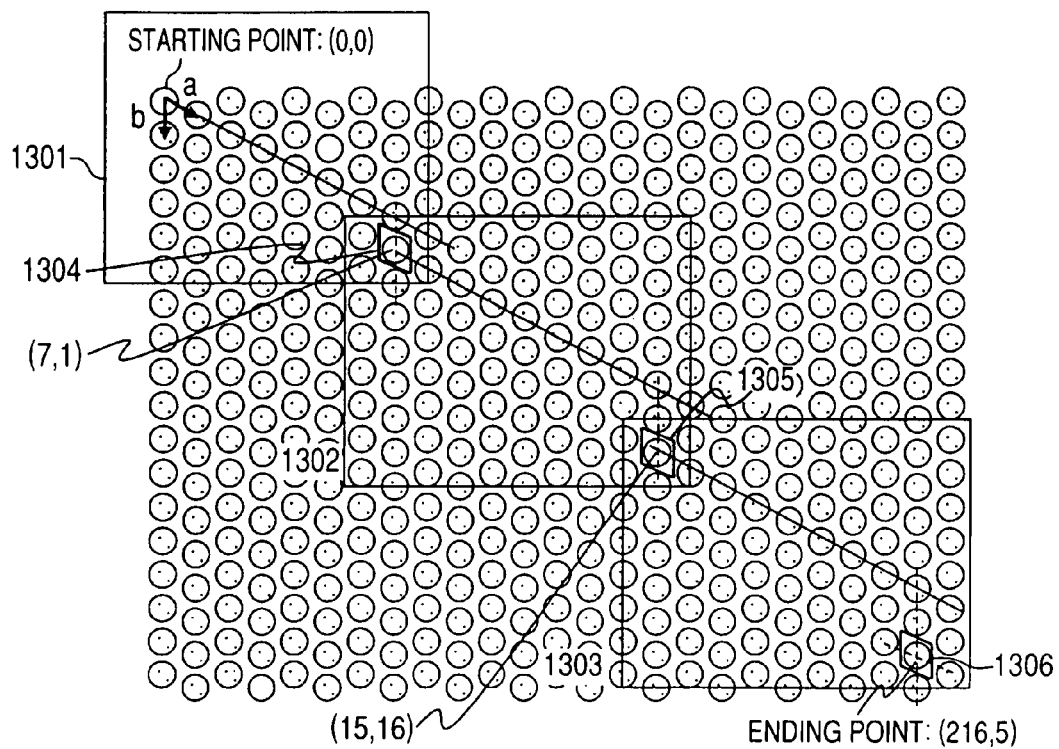
FIG. 13 is an explanatory diagram of describing how an FOV is moved.

In steps 9 to 11, cell counting is executed from the starting point to the ending point while moving the SEM image visual field. FIG. 13 shows how the SEM image visual field is moved from the first FOV (Field of View=visual field) 1301 to the third FOV1303 through the second FOV1302. A frame including the starting point (0,0) identified in step 8 denotes the first array structure image and its right side frame denotes the second array structure image. When moving each FOV, the FOV is moved so that the bottom right of the visual field before the FOV movement overlaps with the top left of the visual field after the FOV movement (that is, the ending point before the FOV movement is positioned at the top left in the FOV after the movement). In the first array structure image, the first detection estimating area is set based on the positional information of the address (0,0) and the unit vector, then first pattern matching is carried out, thus the position of the cell of the (7,1) address positioned in an overlapped area is specified. In the second array structure image, the second detection estimating area is set based on the positional information of the address (7,1) and the unit vector, then second pattern matching is carried out. Above-mentioned procedure is repeated in next array structure image, then finally the position of the end point is detected. So, in the third array structure image, same procedure is repeated. As for the visual field moving technique of the charged particle beam application apparatus in this embodiment, both visual field means and visual field moving distance measuring means are improved. Concretely, a specimen stage is added to the visual field moving means and an image shifting deflector are employed for the apparatus. The specimen stage is wide in visual field moving range, but low in position setting accuracy. On the other hand, the image shifting deflector is narrow in visual field moving range, but high in position setting accuracy. Those characteristics are thus taken into consideration to move the visual field with use of the image shifting deflector (step 10) and the specimen stage is used only when the visual field moving range of the image shifting deflector is changed (step 11).

Figures 12A, 12B:
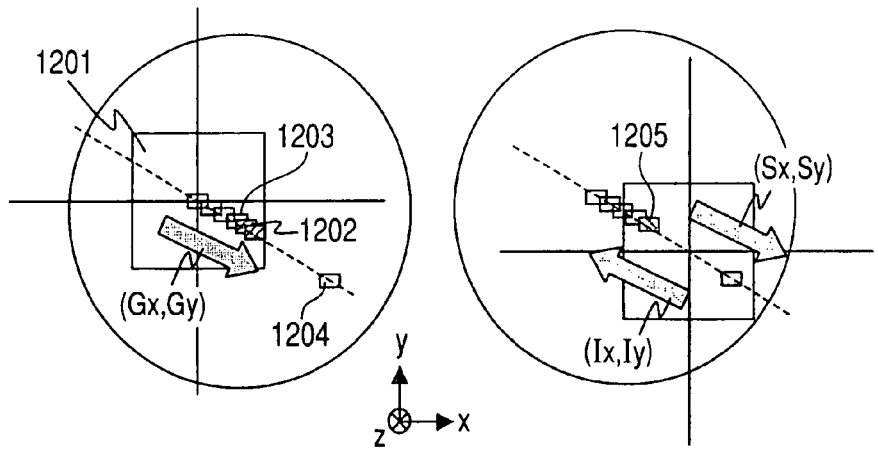
FIG. 12 is a diagram for describing a method of visual field moving range changes with use of an image shifting deflector.

Next, a description will be made for how to change the visual field moving range of the image shifting deflector (step 11) with reference to FIG. 12. At first, a visual field moving vector (Gx, Gy) needed to reach a visual field including an ending point from the array structure image photographed last is calculated. Then, the control value of the image shifting deflector is changed so as to move the visual field only by (Ix, Iy)=−(Gx, Gy). Then, the visual field is moved by (Sx, Sy) with use of the specimen stage to cancel this visual field movement (Ix, Iy). As a result, the visual field moving range of the image shifting deflector is moved only by (Sx, Sy). If (Gx, Gy) is larger than the control value changing range of the image shifting deflector, a vector (Gx, Gy) is divided into a plurality of vectors and the above step is repeated.

Figure 14:
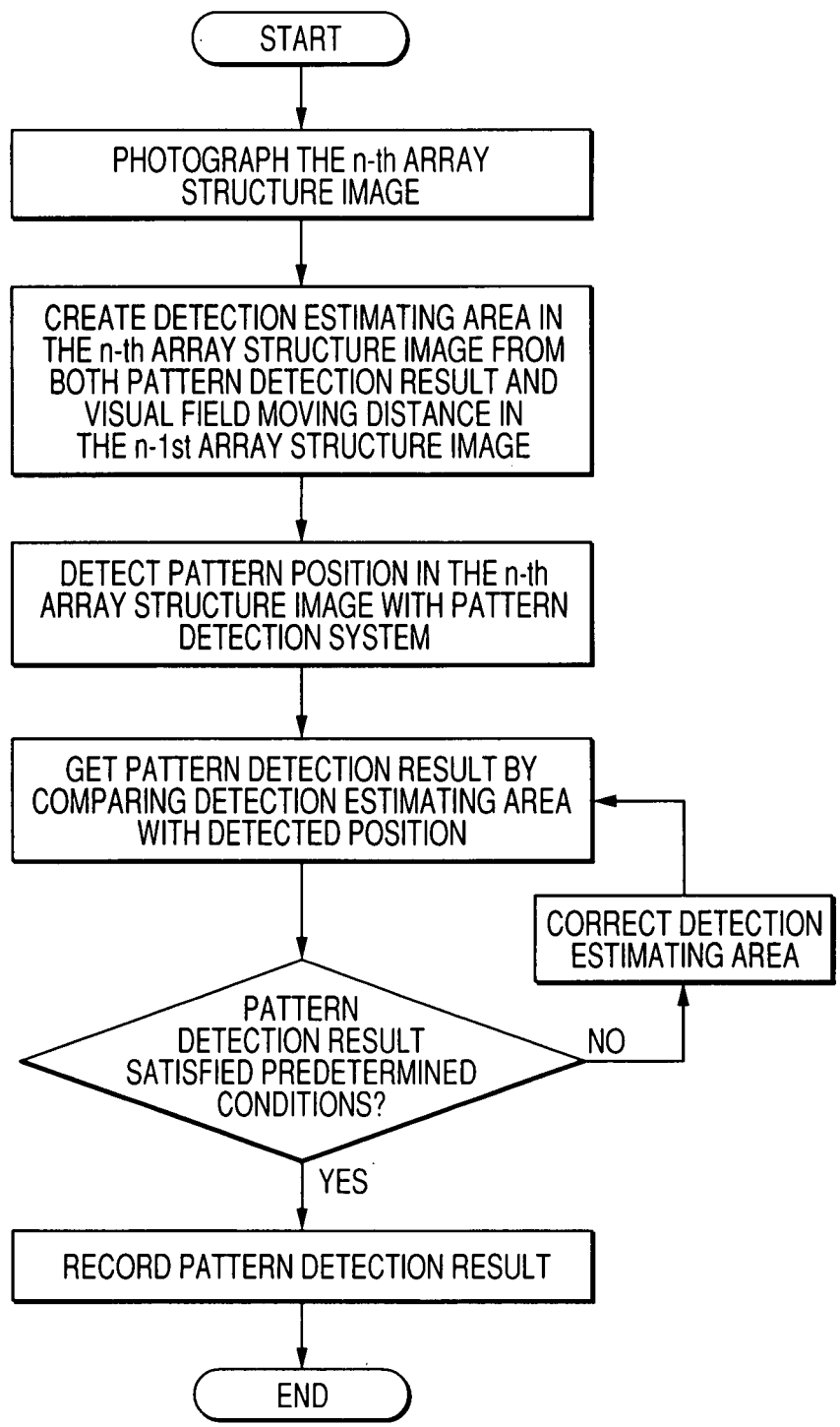
FIG. 14 is a detailed flowchart of the step 9 shown in FIG. 7.

In step 9, pattern counting is done in each array structure image. FIG. 14 shows a flowchart of the pattern counting. The array structure image photographed before the visual field movement is determined as the n−1st array structure image and the array structure image photographed after the visual field movement is determined as the n-th array structure image. At first, in the case of n=1, a detection estimating area in the n-th array structure image is set according to the starting point, the address of the starting point, and the unit vector inputted in step 4. In the case of n>2, a detection estimating area is set according to the pattern detection result in the n−1st array structure image photographed before the visual field movement. The n−1st and n-th array structure images overlap more than the position setting error caused by the image shifting deflector. Because the position setting accuracy of the image shifting deflector is high and the setting error is assumed as to be less than ½ of the unit vector, a detection estimating area can be set in the n-th array structure image on the basis of the pattern detection results obtained in the n−1st array structure image. Thus a pattern position in the n-th array structure image is identified in pattern matching with the reference pattern image. Then, the detection estimating area is compared with the detected position to generate such pattern detection results as correct detection, oversights, wrong detection, etc. If the pattern detection results satisfy the predetermined conditions, the pattern detection results are recorded and control goes to the next step. Then, the following predetermined conditions are set; the rate of correction detection is over a certain value, wrong detection and oversights are not distributed like a cluster, etc. Those conditions setting will be described later in the fourth embodiment. If the predetermined conditions are not satisfied, the detection estimating area must be corrected. Thus the starting point and the unit vector are corrected.

Figure 15:
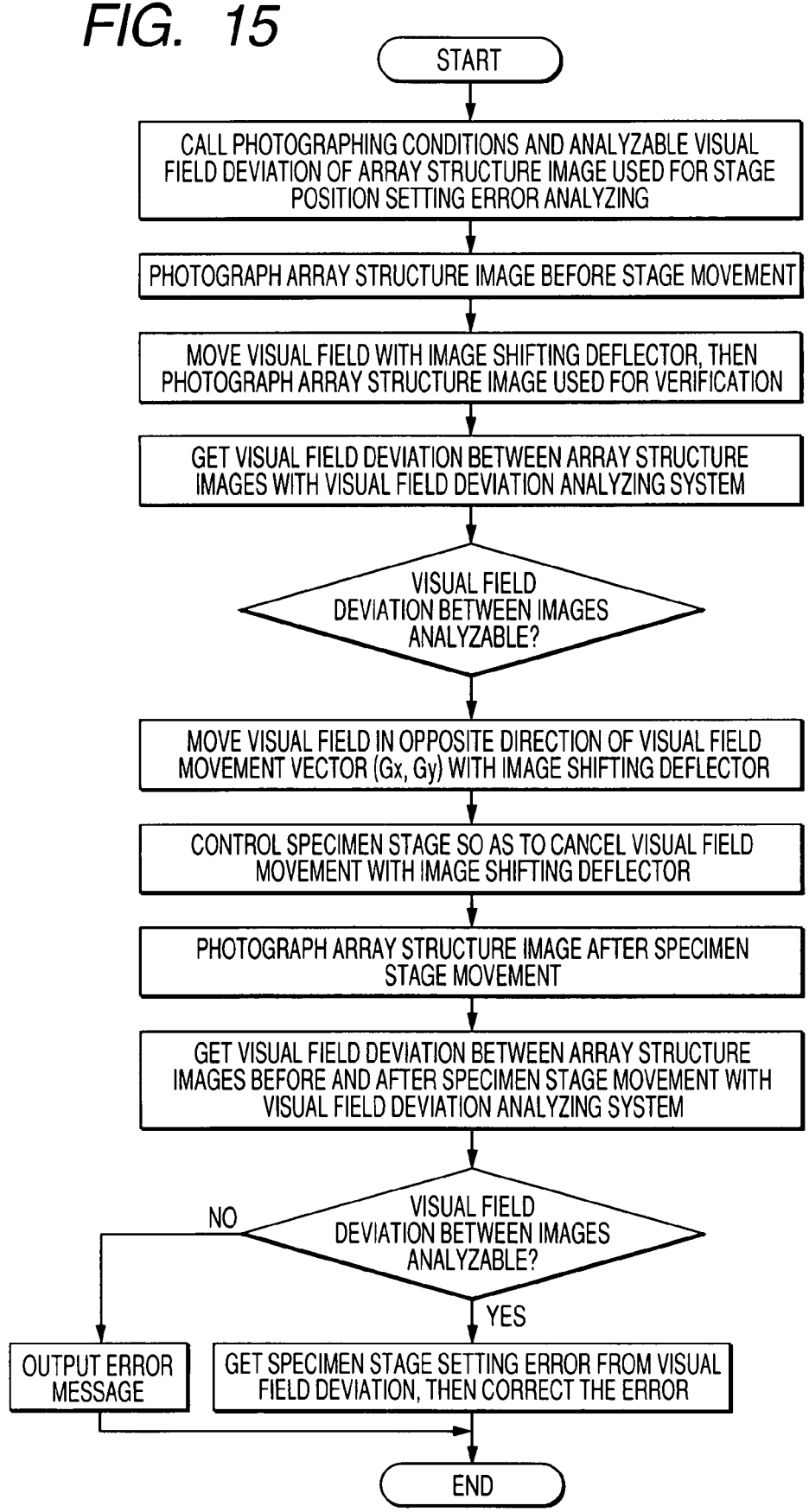
FIG. 15 is a detailed flowchart of the step 9 shown in FIG. 11.

After that, the visual field is moved with use of the image shifting deflector until the ending point is included in the photographed array structure (step 10). If the ending point is not reached within the moving range of the image shifting deflector, the change of the image shifting deflector control value is canceled with a specimen stage movement (step 11), then the visual field is kept moved by the image shifting deflector. FIG. 15 shows the procedure of step 11. After that, the array structure image photographing conditions for analyzing the stage position setting error and the analyzable visual field deviation are called. Then, the array structure image before stage movement is photographed. Then, the visual field is moved by a predetermined distance with use of the image shifting deflector and the array structure image to be verified is photographed. Those images are used to verify whether or not the visual field can be analyzed. This verification step can be omitted. After the visual field is moved by (lx, ly) with use of the image shifting deflector, then the visual field is moved by (Sx, Sy) to cancel the visual field movement (lx, ly) with use of the specimen stage (see FIG. 12), then the array structure image after the specimen stage movement is photographed. After that, a visual field deviation is found between the array structure images before and after the specimen stage movement. Then, the specimen stage position setting error is found from the visual field deviation to correct the visual field with use of the image shifting deflector or to correct the starting point in the array structure image for pattern detection to correct the visual field.

Here, a description will be made for adjustments of the image shifting deflector and the specimen stage to be executed in step 8. Because the specimen stage is low in position setting accuracy, the adjustment of the image shifting deflector by the specimen stage in step 11 might result in fail. So, in order to reduce the number of this adjustments as many as possible, the flow shown in FIG. 11 is executed in step 8. At first, the specimen stage is moved according to the setting data inputted in step 5. The visual movement vector (Gx, Gy) for reaching the ending point from the starting point is obtained according to the setting data inputted in step 4, then the visual field is moved only by (Ix, Iy) in the direction of −(Gx, Gy) with use of the image shifting deflector. Then, the visual field is moved by (Sx, Sy) with use of the specimen stage to cancel the visual field movement (Ix, Iy) by the image shifting deflector and the array structure image is photographed on the same conditions as those in step 5. At this time, there is a visual field deviation caused by a specimen stage position setting error between the array structure image photographed in step 5 and the array structure image photographed in step 8. This visual field deviation is thus analyzed by the visual field deviation analyzing system to identify the coordinates of the starting point on the photographed array structure image.

Figure 16B:
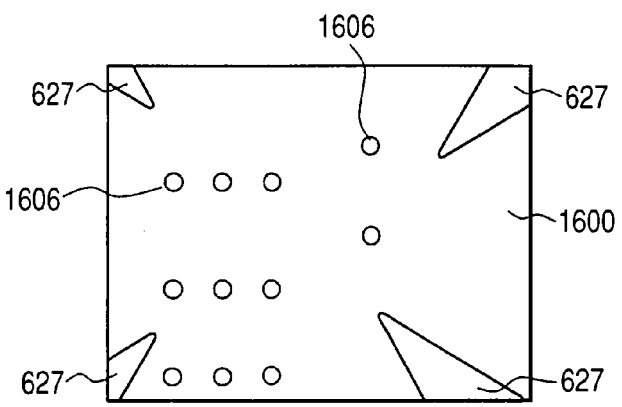
Figure 16C:
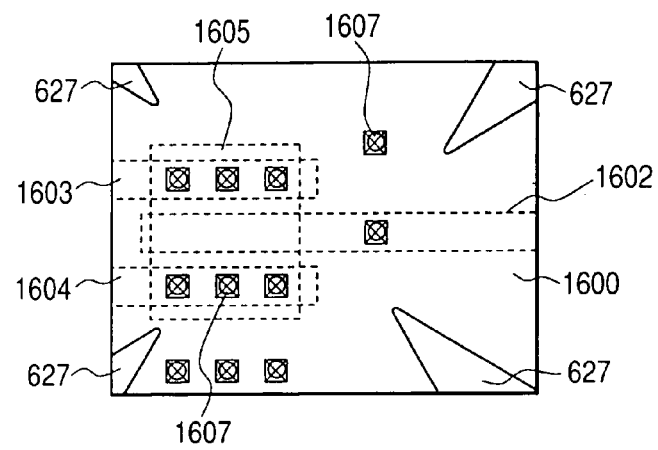

When the ending point is reached, the inputted electrical characteristics analysis process is executed (step 12). Hereunder, the details of the analysis process will be described. At first, the position with respect to the CAD image (FIG. 16A) used in step 7 is adjusted according to the SEM image of the array structure image (FIG. 16B) that includes the ending point and its pattern detection results. FIG. 16C shows a display example of an SEM image and a CAD image that are put one upon another. This display makes it possible to analyze the electrical characteristics of the specimen while confirming the internal specimen device structure, thereby the specimen device can be used more easily. After that, the tip of a probe is moved into the visual field of the SEM image with use of the probe driving means 625. The probe moving distance up to the visual field of the SEM image is calculated by giving consideration to both of the visual field movement and the DUT stage visual field movement by the image shifting deflector. The position setting accuracy of the probe driving means is several μm and the visual field diameter of the SEM image is estimated to be several tens μm, so that it is possible to move the probe into the visual field of the SEM image. Confirming that all the probes to be used are included in the SEM image, the probing process is started. Confirming that each probe contact is done correctly with the electrical characteristics, the set electrical characteristic measurement is executed. At this time, the subject array structure image should be photographed on the conditions for obtaining visual field deviation analyzing image just after the ending point is identified so as to be prepared for a change of the DUT stage in position to be caused by such an external disturbance as drifting.

The processings in steps 8 through 12 are all required to be completed for the present. After all the inputted conditions are executed, all the processes are ended.

Figure 17:
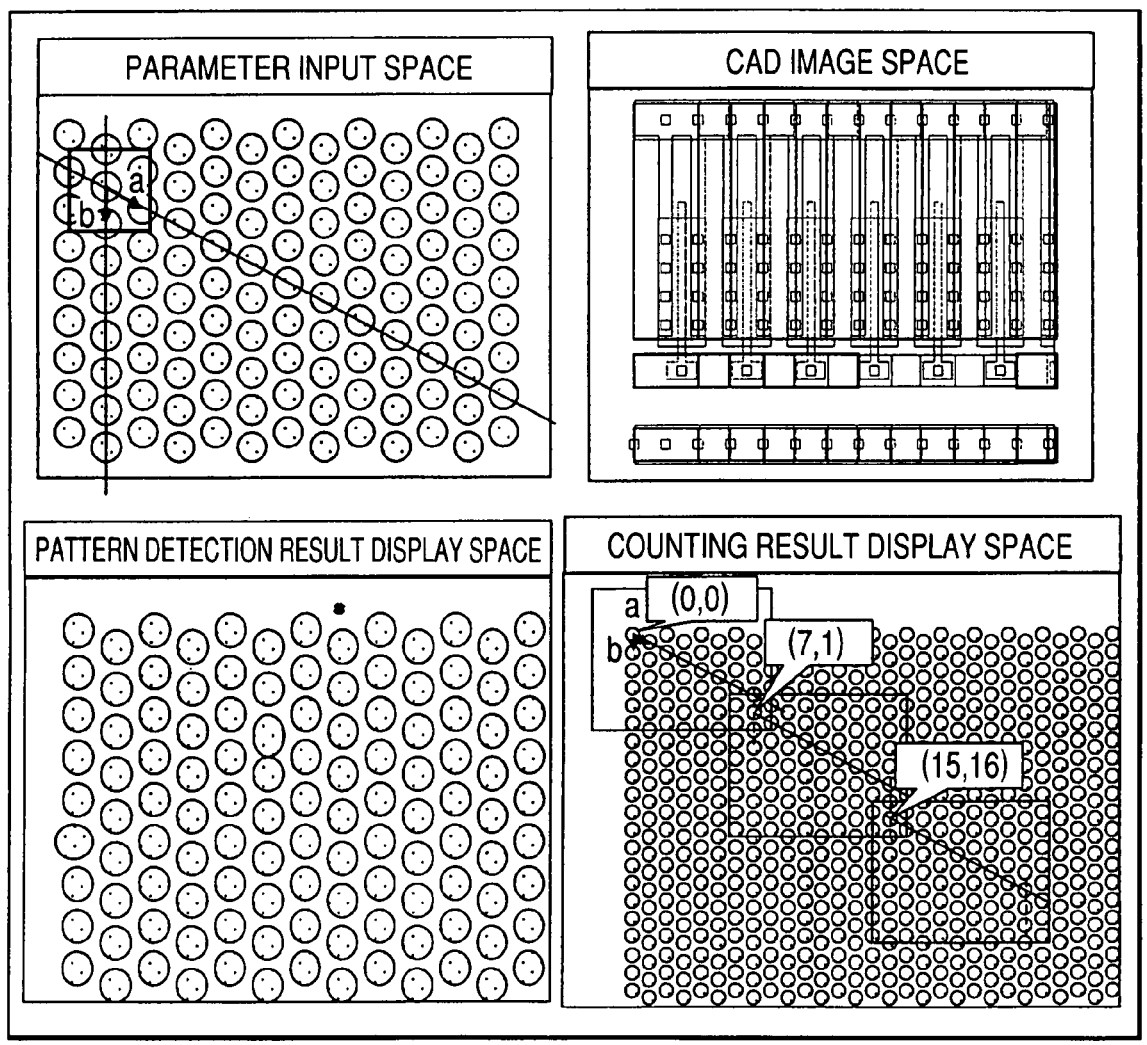
FIG. 17 is a configuration of the GUI of the charged particle beam application apparatus in the second embodiment.

Finally, FIG. 17 shows an example of a control screen. The control screen can display an array structure image, a CAD image, and those two images that are put one upon another. The control screen can also display a reference pattern, a unit vector, and a starting point that are displayed together with an array structure so as to be put in layers (parameter input space). Pattern detection results can also be displayed together with an array structure image and a CAD image in layers (pattern detection results display space). There is also a control screen on which an address assigned to each pattern can be confirmed (counting result display space).

As described above, the probe contact type characteristics evaluation apparatus in this embodiment makes it possible to improve the cell counting accuracy, thereby the accuracy for probing at a target position is improved. Furthermore, the probing time is also reduced.

This Embodiment

In this third embodiment, a description will be made for a case in which a pattern counting system of the present invention is applied to a specimen machining apparatus that uses an ion beam.

Figure 18:
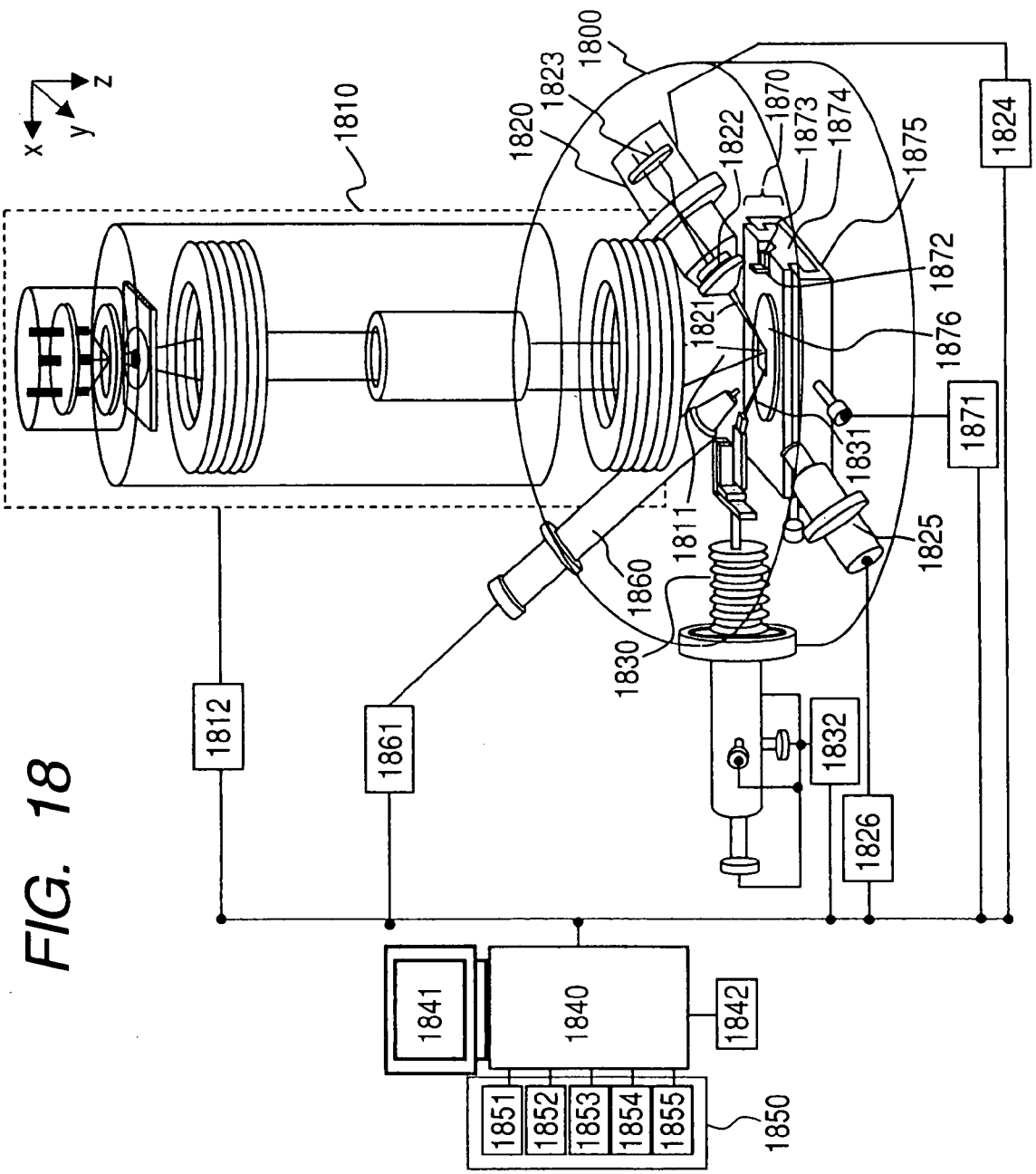
FIG. 18 is an overall configuration of the charged particle beam application apparatus in the second embodiment.

FIG. 18 shows a basic configuration of an ion beam machining apparatus. The ion beam machining apparatus is composed of an ion beam illuminating optical system 1810 for illuminating an ion beam 1811 onto such a specimen 1876 (object to be machined) as a semiconductor wafer, semiconductor chip, or the like, an ion beam illumination optical system control unit 1812 for controlling the operation of the ion beam illuminating optical system 1810, a specimen stage 1870 for mounting a specimen 1876 and moving an observation area of the specimen 1876 into an ion beam illuminating area, a specimen stage control unit 1871 for controlling the position of the specimen stage 1870, a manipulator control unit 1832 for controlling a manipulator 1830, a deposition gas supply source 1860 for supplying a sedimentary gas (deposition gas) around the observation area of the specimen 1876, a deposition gas supply control unit 1861 for controlling the deposition gas supply source 1860, an electron beam illuminating optical system 1820 for illuminating a primary electron beam 1821 for SEM images onto the surface of the specimen 1876, an objective lens 1822, an electron gun 1823, a secondary electron detector 1825 for detecting secondary electrons discharged from the surface of the specimen 1876, an SEM illuminating optical system control unit 1824 for controlling the electron beam illuminating optical system, a control computer 1840 for controlling the whole ion beam machining apparatus, an A/D converter for converting output signals from the secondary electron detector 1825 to A/D signals, an image operation unit 1850 for processing output signals of the secondary electron detector 1825 converted to digital data through A/D conversion, etc.

In the ion beam machining apparatus, the incoming directions of the primary electron beam 1821 and the ion beam 1811 with respect to the specimen 1876 are determined by the direction in which the cross section of the specimen is to be exposed and to be formed into a thin film. This is why the specimen stage 1870 is provided with a stage tiling function with respect to the ion beam illuminating optical axis and a rotating function (θ stage) with respect to the stage center axis. Thus both declining angle and rotating angle of the position of the specimen 1876 in the three-dimensional directions, as well as the surface of the specimen 1876 can be controlled freely with respect to the ion beam axis. Consequently, it is possible to set freely the ion beam illumination position (processing position) on the surface of the specimen 1876, as well as the illuminating angle and rotating angle of the ion beam with respect to the surface of the specimen 1876. The ion beam illuminating optical system 1810, the specimen stage 1870, the deposition gas supply source 1860, the ion beam illuminating optical system 1810, and the secondary electron detector 1825 are disposed in a vacuum chamber 1800 to be highly evacuated.

The control computer 1840 controls the whole ion beam machining apparatus including such charged particle optical systems as the ion beam illuminating optical system 1810, the electron beam illuminating optical system 1820, etc. or the mechanical systems of the whole ion beam machining apparatus such as the specimen stage 1870, the manipulator 1830, etc. generally. Thus the control computer 1840 includes storage means 1855 for storing software for controlling each of the connected components, a user interface 1842 used for the user to input apparatus setting parameters, and a display 1841 for displaying various types of operation screens and SEM images. In addition, the image operation unit 1850 includes a plurality of image processing units 1851 to 1853 and a CAD navigation system 1854 for handling wiring layout data (hereunder, to be referred to as CAD image data) of the object specimen.

Figure 19A:
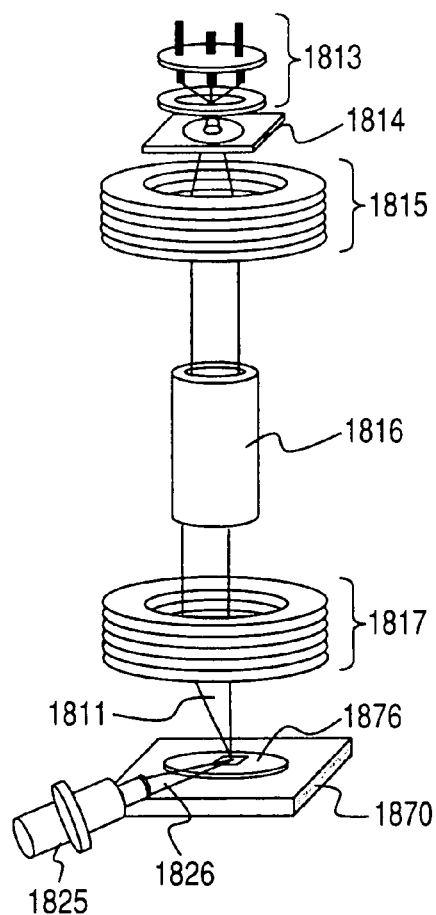
FIG. 19 is a configuration of a major part of each of a focusing ion beam column and a projection ion beam column.

The ion beam illuminating optical system 1810 shown in FIG. 18 uses a focused ion beam (FIB). However, a shape forming (projection) ion beam (PJIB) may be formed with the same mirror body. FIG. 19A shows a configuration of the major part of the focused ion beam (FIB) illuminating optical system that uses a focused ion beam for machining specimens. An ion beam output from the ion source 1813 is passed through a beam limiting aperture 1814, a focusing lens 1815 for suppressing and focusing the spread of the ion beam, and an objective lens 1817 for focusing the ion beam on the specimen 1876 so as to form a focused ion beam 1811. This ion beam 1811 scans on the specimen 1876 through the deflector 1816 to machine the specimen 1876 in accordance with the scanning shape. The focused ion beam may also be used as observing means. The focused ion beam scans the surface of the specimen 1876 and the secondary electron detector 1825 detects secondary electrons generated from the surface of the specimen 1876. Then, the secondary electrons are synchronized with the scanning signal to form and display images.

Figure 19B:
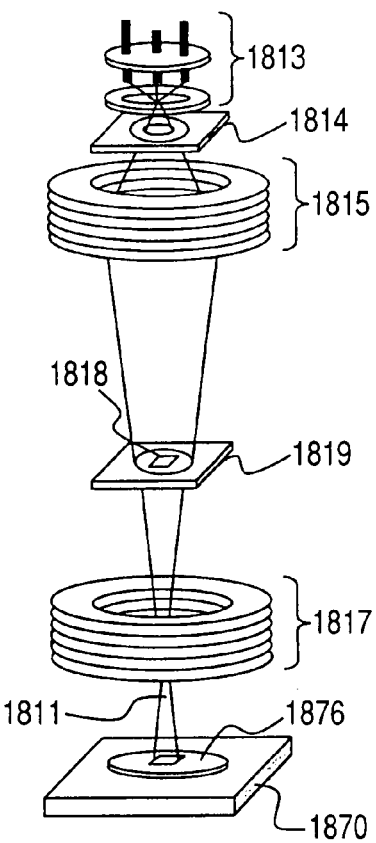

FIG. 19B shows a configuration of a major part of the shape forming (projection) ion beam (PJIB) illuminating optical system. The ion beam emitted from the ion source 141 is illuminated onto a projection masking plate 1819 through a beam limiting aperture 1814 and an illuminating lens 1815 respectively, then the ion beam passing through a pattern aperture 1818 of the masking plate 1819 is projected onto the surface of the specimen 1876 put on the specimen stage 1870 through a projection lens 1817. The surface of the specimen 1876 is machined almost similarly to the pattern aperture 1818 due to the ion beam formed as described above.

Figure 20:
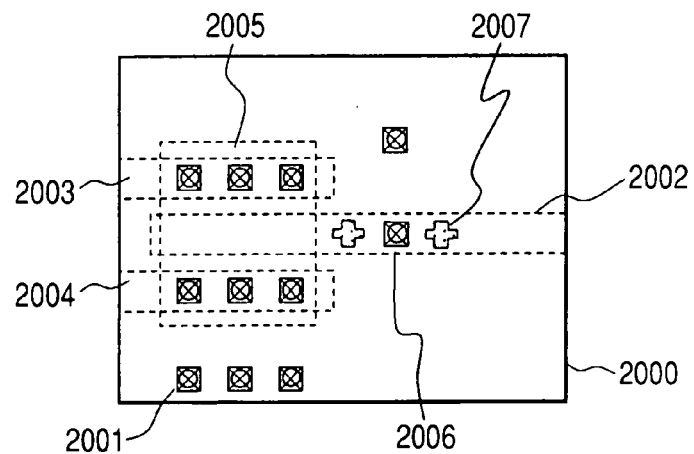
FIG. 20 is an image displayed on a display screen after cell counting ends in a charged particle beam apparatus in a third embodiment.

Next, the procedures of specimen machining realized by the ion beam machining apparatus in this embodiment will be described with reference to FIGS. 7, 20, and 21.

Basically, the specimen machining procedures of the ion beam machining apparatus in this embodiment are almost the same as those of the charged particle beam application apparatus in the second embodiment. In the following description, therefore, only the machining process specific to the ion beam apparatus will be described step by step. Because this apparatus can obtain both SEM and SIM images, any of the SEM and SIM images can be used as an array structure image used for cell counting. Concretely, a request to select either a SEM or SIM image is displayed on the display device 1841 and the control computer 1840 switches between the ion beam illuminating system and the electron beam illuminating system according to the response of selection inputted through the user interface. The advantage for using the SEM image is less damage on the surface of the specimen. In the case of the SIM image observation using an ion beam as an incoming beam, the surface of the specimen is trimmed gradually during observation. To protect the surface of the specimen from damages, the SEM image should be selected. The disadvantage for using a SEM image as an array structure image in the ion beam machining apparatus in this embodiment is a deviation to occur in a machining position (that is, ion beam illuminating position) if the SEM/SIM image visual field is deviated. To avoid such a trouble, therefore, the visual field of the SEM/SIM image should be adjusted at the required accuracy before the specimen machining begins. To adjust the visual field at such an accuracy, for example, it is needed to obtain proper alignment mark SIM and SEM images, the alignment mark coordinates on each of the obtained SEM and SIM images are compared with the alignment mark absolute coordinates to calculate the subject visual field deviation. If an estimated visual field deviation is larger than the accuracy of required machining position setting, the SIM image should be selected.

After selecting an image used as an array structure image, the specimen position is adjusted while observing the image. Then, to link the specimen stage control unit 1871 with the CAD navigation system 1854, the position setting error that might occur when a specimen 1876 is put on the specimen stage 1870 is corrected with use of a plurality of alignment marks disposed on the specimen 1876.

In parallel to the adjustment of the above described first charged particle optical system or after the adjustment, the second charged particle optical system is adjusted. Incase where a SIM image is used as an array structure image, it is only needed to adjust the ion beam illuminating optical system 1810 as the charged particle optical system. At that time, the following two conditions should preferably be set beforehand; one of the conditions is a specimen observing FIB illuminating condition for reducing the current flow by narrowing the beam diameter and the other condition is a specimen machining FIB illuminating condition for increasing the current flow by widening the beam diameter. In case where a SEM image is used as an array structure image or in case where both SEM and SIM images are to be used, both the ion beam illuminating optical system 1810 and the electron beam illuminating optical system 1820 are adjusted. In this case, after adjusting each of the illuminating systems, the visual field deviations of the ion beam illuminating optical system 1810 and the electron beam illuminating optical system 1820 are calculated and corrected. To correct those visual fields, for example, the image shifting deflector is driven so that the deflection in the deflector becomes equal to each of the visual field deviations. In case where a PJIB is used to machine a specimen while observing the specimen with a SEM image, each illuminating system is adjusted, then the visual field deviation between the illuminating systems is corrected. Then, the specimen is machined with an ion beam and the machining shape is observed with a SEM image to measure the visual field deviation between the illuminating systems, thereby the deviation is corrected with use of the image shifting deflector.

The processes in steps 3 to 6 are almost the same as those described in the first embodiment except for that the image type used for observing the specimen structure and the specimen stage type used for moving the specimen are different, so that the description for the processes will be omitted here.

In step 7, specimen machining procedures executed around an ending point are inputted. Then, a device structure of which cross sectional image is to be observed is inputted to the CAD navigation system and the surface structure existing on the device structure is output. After that, the CAD image including the surface structure is displayed and both machining procedure and machining position are specified on the CAD image. The ending point for pattern counting is also inputted on the CAD image here. Then, the address of the ending point is calculated according to the starting point, its address, and the unit vector inputted on the CAD data respectively.

Next, a specific flow of pattern counting in step 8 will be described. In the specimen machining, both incoming and scanning directions of both primary electron bean 601 and ion beam 1811 are determined by the direction in which the cross section of the specimen to be exposed and to be thin-filmed. The rotating mechanism of the XY in-plane is adjusted with respect to the specimen stage 1870 in accordance with those conditions. If a specimen is rotated after pattern counting, the ending point might be lost. To avoid this trouble, the specimen rotating angle should be set before pattern counting. Thus the specimen machining conditions are called to find an in-plane rotating angle, then the specimen is rotated with use of the specimen stage control unit 1871.

After that, the specimen stage 1870 is controlled so as to include the starting point in the visual field. And because the specimen stage control unit 1871 is linked with the CAD navigation system 1854, the specimen stage control value in the XY direction, inputted before the specimen rotation (step 5) is converted automatically to that to be used after the specimen rotation (step 8). Furthermore, the visual field is moved with use of the image shifting deflector as described in the first embodiment and the specimen stage is controlled to cancel the visual field movement, then the array structure image including the starting point is photographed. If there is a rotating angle difference between the array structure image photographed in step 5 and the array structure image photographed in step 8, the array structure images are rotated to eliminate the angle difference between the images, then to correct the visual field deviation between the images. If a specimen stage rotating angle setting error is expected at this time, it may be corrected with an image processing method that can analyze the parallel moving distance, angle difference, and reduced scale between images. Then, the coordinates of the starting point in the array structure image photographed in step 8 is identified from both the visual field deviation between images and the coordinates of the starting point in the array structure image recorded in step 5.

In step 9, pattern counting is executed in each array structure image. At first, the reference pattern and the unit vector are corrected according to the specimen rotating angle set in step 8. Then, a detection estimating area is generated according to the corrected unit vector, as well as the starting point and the address of the starting point identified in step 9. Then, the subject pattern position in the array structure image is detected with use of the corrected reference pattern. All the processes other than the above ones are almost the same as those in step 9 described in the first embodiment.

The processes in steps 10 and 11 are executed in almost the same procedures as those in the first embodiment; the image type used for specimen structure observation and the specimen stage controlling means in this embodiment are only the different items from the first embodiment.

In step 12, the machining process inputted in step 7 is executed. According to the array structure image including an ending point and its pattern detection result, the position with respect to the CAD image used in step 7 is adjusted. FIG. 20 shows an example of an image displayed on the display means 1841 just before the machining in step 12 begins when the ending point is reached as a result of preceding counting. In FIG. 20, the screen displays a CAD image around an ending point, as well as a SEM image that is put on the CAD image. Reference numerals displayed on the screen are defined as follows; 2000 denotes a specimen, which is, for example, a divided part of a semiconductor chip, a semiconductor wafer, or the like and 2001 denotes a wiring plug, 2002 to 2005 denote wirings. 2006 denotes a plug to be machined. 2007 denotes a marking formed with an illuminated electron or ion beam to identify a plug to be machined.

Figure 21:
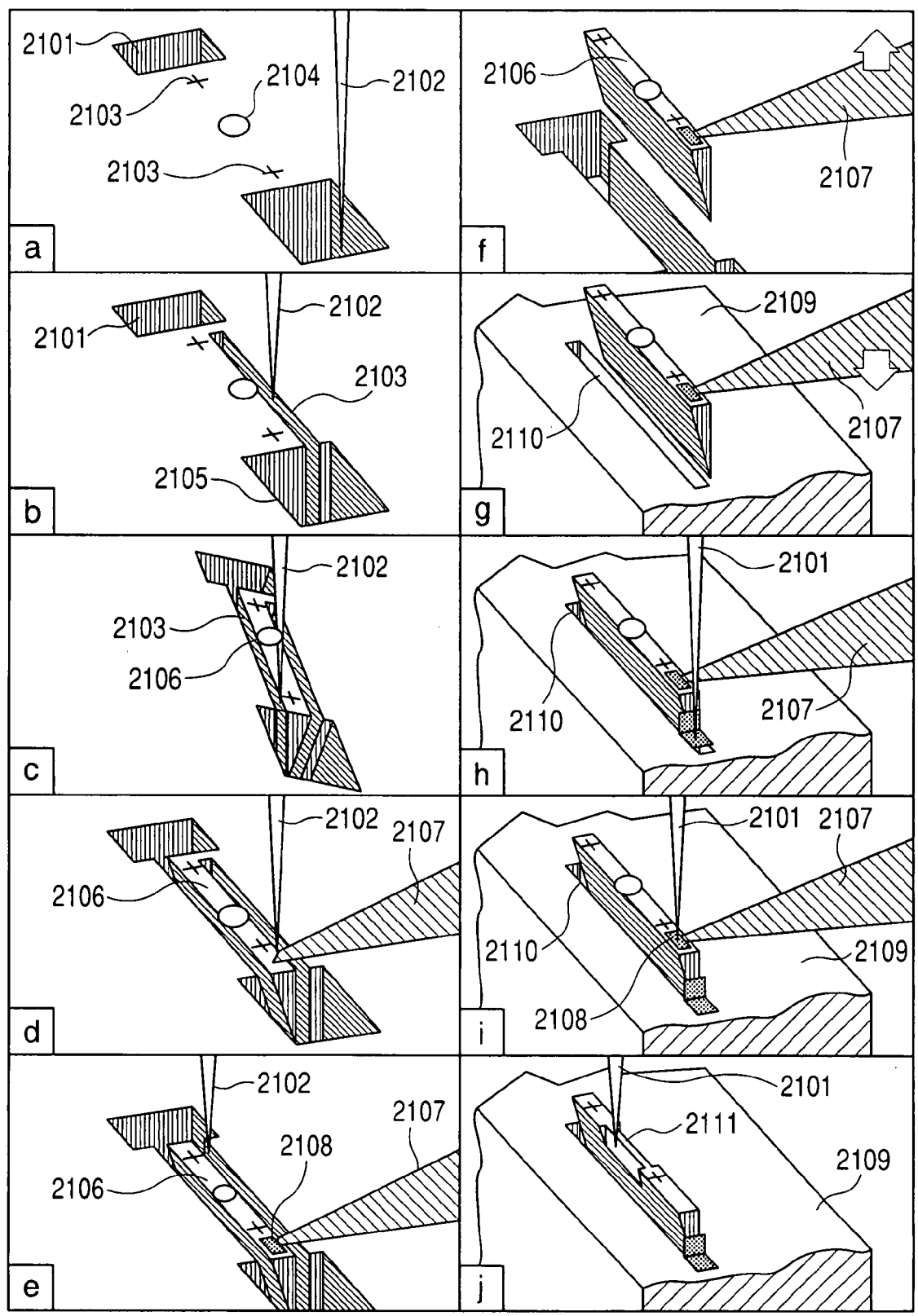
FIG. 21 is a flowchart of specimen machining in the charged particle beam application apparatus in the third embodiment.

FIG. 21 shows an example of ion beam machining executed in step 12. In step (a) shown in FIG. 21, a machining ion beam 2101 is illuminated onto both sides of the marking 2103 to form a hole 2101. 2104 denotes a plug to be machined and it is equivalent to 2007 shown in FIG. 20. Hereunder, a groove for connecting two holes to each other is formed in step (b), then a cuneiform specimen piece 2106 is formed with an illuminated ion beam while the stage is tiled in step (c). In step (d), the manipulator 1830 is driven to put the tip of a probe 2107 in contact with the cuneiform specimen piece 2106 to form a deposition film for connecting the tip of the probe to the cuneiform specimen piece with an illuminated ion beam 2102. In step (e), a connecting part is cut off with an illuminated ion beam from a parent material for removing the cuneiform specimen piece 2106 and the specimen piece respectively. In step (f), the specimen piece is lifted out from the parent material by operating the manipulator 1830. The specimen piece 2106 stuck to a probe is moved to a sample carrier 2109 in step (g) and put in a fixing groove 2110 on the surface of the sample carrier in step (h). Then, in steps (h) and (g), the deposition film 2108 for sticking the probe 2107 and the specimen piece 2106 to each other is removed with an illuminated ion beam 2101, thereby the probe 2107 is separated from the specimen piece 2106. In step (j), a side of the plug 2104 is trimmed with an illuminated ion beam 2101 to form a thin film specimen having a cross sectional face of a plug finally.

The processes in steps 8 to 12 are all that are required for the present. When all the inputted conditions are executed, all the processes are ended.

As described above, the ion beam machining apparatus in this embodiment can improve the accuracy of cell counting, thereby the accuracy of sampling for target structures is improved. Furthermore, the sampling time is also reduced.

Fourth Embodiment

In this embodiment, a description will be made for a configuration of a charged particle beam apparatus provided with a function for correcting cell counting errors. When correcting such a cell counting error, a detection estimating area is used. The counting conditions resetting function to be described later in this embodiment may be applied for the apparatus in any of the second and third embodiments. In this embodiment, however, the explanation will be focused on a measuring apparatus (such as a measuring system, defect review system, or external view inspection system) using a scanning electron microscope particularly on the premise of the resetting function is installed.

Figure 22:
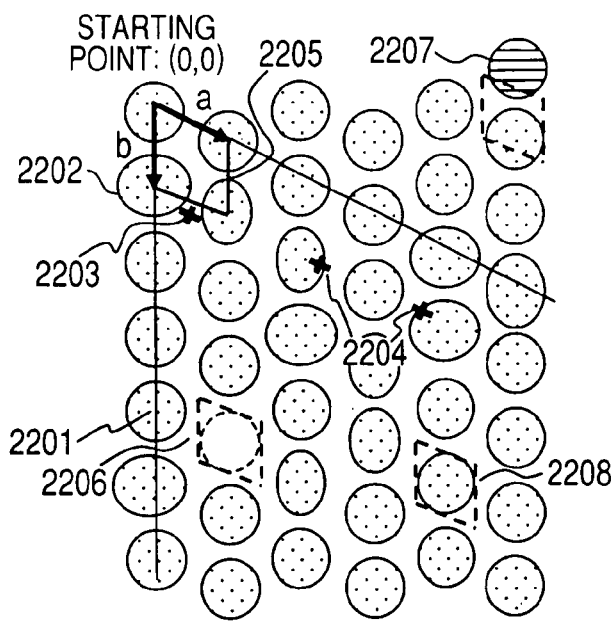
FIG. 22 is a diagram for describing a relationship between the variation/foreign matters and errors of a pattern shape.

At first, error causes to be picked up in this embodiment will be described with reference to FIGS. 22 through 24. FIG. 22 shows a case in which a cell counting error occurs, since patterns are not shaped uniformly and there are many foreign matters included in the obtained array structure image. In FIG. 22, it is premised that a distorted bit 2202, as well as many foreign matters 2003 are included in the subject array structure image in addition to a normal bit 2201. The foreign matters to be included in specimens areas follows, for example; a foreign matter 2203 detected at a position in which no bit is formed and a foreign matter 2204 detected at a bit formed position. In the case of an array structure image that includes such a pattern distortion and many foreign matters, oversights and wrong detection occur even in pattern matching performed based on a reference pattern 2205. An oversight mentioned here means that no pattern is detected in an area 2206 even when a detection estimating area (represented by a dotted line rhombus in FIG. 22) is set. Wrong detection means that a pattern is detected in an area (e.g., area 2207) other than the target detection estimating area. In case 2208 where a pattern is detected actually in the target detection estimating area in pattern matching, the detection is referred to as correct detection. A rate of oversights and wrong detection is considerably low, pattern counting can be continued only with correctly detected patterns. If the rate of oversights and wring detection is high, however, it is required to review the array structure image photographing conditions (magnification, fetching time, etc.), reference pattern setting conditions (shape, size, etc.), image processing conditions (threshold value, etc.) for pattern matching.

Figure 23:
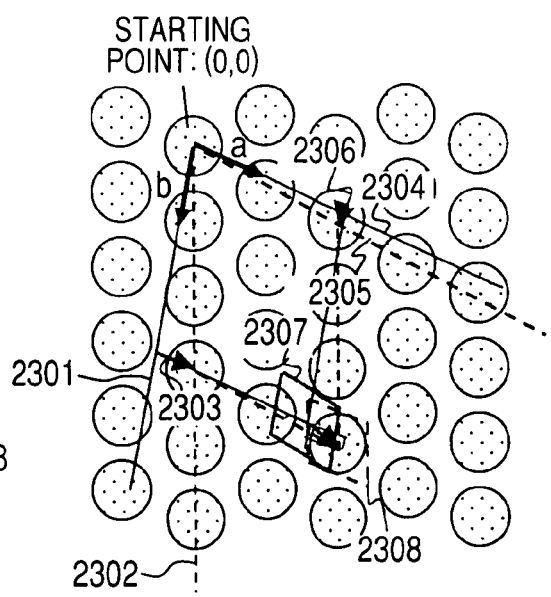
FIG. 23 is a diagram for describing a relationship between setting and errors of a unit vector.

FIG. 23 shows an explanatory diagram for a case in which oversights and wrong detection occur due to the first setting of an improper unit vector. In FIG. 23, additional lines 2304 and 2301 are extended lines of unit vectors a and b, and dotted lines 2205 and 2202 denote proper coordinate axes of the array structure image shown in FIG. 23. Because of such improper unit vectors, a detection estimating area 2307 determined by the unit vectors is separated from an original detection estimating area 2308. And this separation comes to cause oversights and wrong detection. As shown in FIG. 23, a deviation caused by improper unit vectors increases in proportion to the extension of the distance from the starting point (0,0). In this case, the unit vectors must be corrected.

Figure 24:
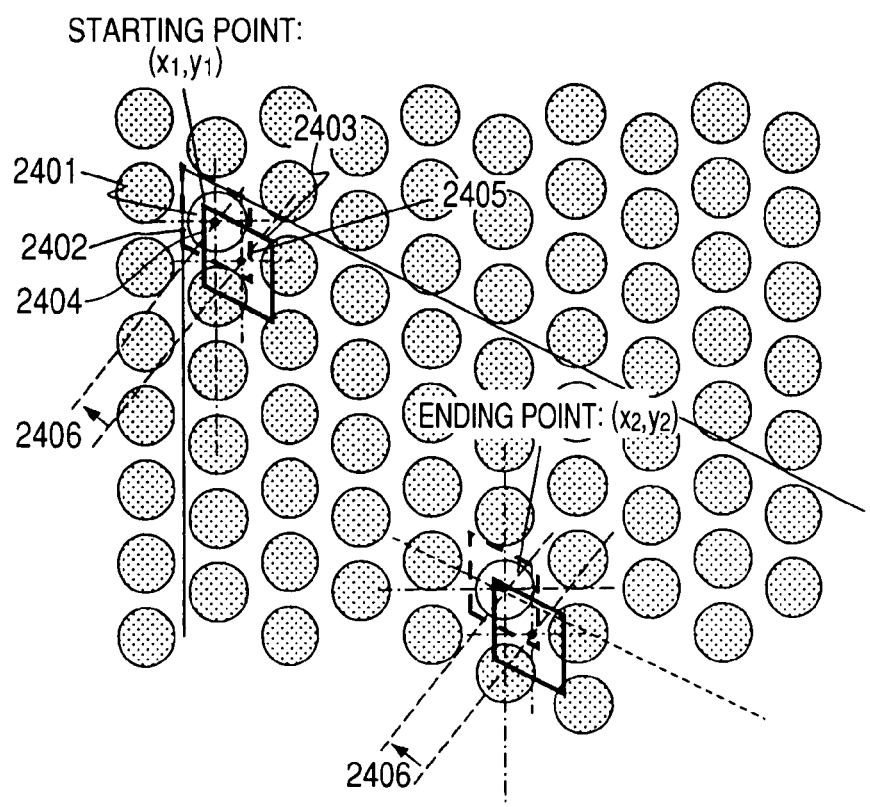
FIG. 24 is a diagram for describing a relationship between displacement and errors of a starting point.

FIG. 24 shows a concept diagram for showing oversight and wrong detection occurrence caused by displacement of an starting point. For example, when the starting point of the n−1th photographed array structure image is taken over to the n-th photographed array structure image, the starting point is transmitted wrongly sometimes due to a visual field moving error. In FIG. 24, if the center coordinates 2405 of an actual starting point are displaced from the correct center coordinates 2404 when cell counting is started at the starting point (x1,y1) 2401, then the detection estimating area 2403 (displayed with a solid line) is formed away from the correct detection estimating area 2402 (displayed with a dotted line) and the subsequent cell counting is made while the displaced starting point 2406 is left as is. This is why a correcting function is needed to correct such a displacement of a starting point.

Figure 25:
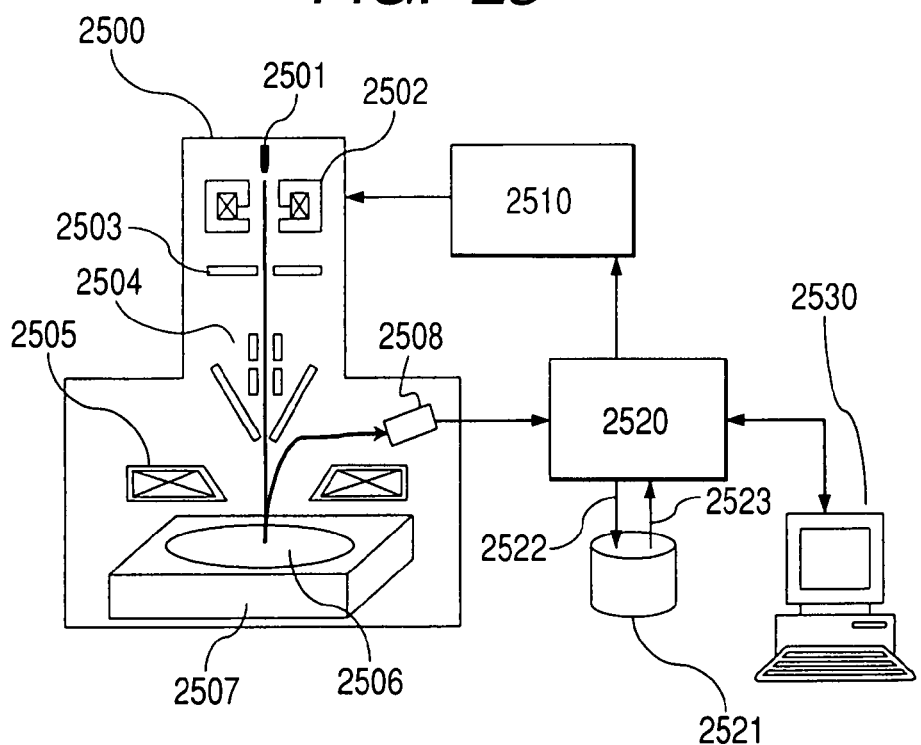
FIG. 25 is an overall configuration of a charged particle beam application apparatus in a fourth embodiment.

FIG. 25 shows an explanatory diagram of an overall configuration of an electron beam application apparatus in this embodiment. The scanning electron microscope in this embodiment is roughly composed of a scanning electron microscope 2500, a control unit 2510 for controlling the microscope 2500, a computer 2520 for controlling the host of the control unit 2510, and a user interface 2530 for inputting necessary information and setting conditions for the operation of the computer.

The scanning electron microscope 2500 is composed of an electron source 2510 for generating a primary electron beam, a condenser lens 2502 for controlling a cross-over position of the generated primary electron beam, a limiting iris member combined with controlling of the cross-over position of the condenser lens 2502 to adjust a current flow of the primary electron beam, a scanning deflector 1504, an objective lens 2505, a specimen stage 2507 for holding a specimen 2506 to be measured, a detector 2508 for detecting secondary electrons or back scattered electrons generated from the primary electron beam, etc. The control unit 2510 is actually composed of a plurality of microcomputers for controlling driving power supplies and power supplies of the components of the scanning electron microscope 2500. The control unit 2510 supplies necessary current, voltage, or control signals to the scanning electron microscope 2500 to actually operate the scanning electron microscope 2500. The computer 2520 computes control information required to operate individual components of the SEM systematically (e.g., cooperative control information of the components of the scanning electron microscope 2500 required to operate the whole apparatus on the conditions set and inputted from the user interface 2530) and transmits the information to the control unit 2510. The computer 2520 also synchronizes the detection signal of the detector 2508 with the modulation frequency of scanning signals to compute the two-dimensional intensity distribution data of the secondary electrons or back scattered electrons and display the result on a display device (not shown). The computer 2520 incorporates an operation device and a memory used to execute various types of computing described above respectively. In addition, the computer 2520 incorporates an external storage 2521 for storing obtained two-dimensional distribution data and various types of software executed by the operation device. Signal lines 2522 and 2523 are used to connect the external storage device 2521 to the computer 2520.

Next, a description will be made for the operation of the charged particle beam application apparatus in this embodiment with reference to FIGS. 7 and 26. The charged particle beam application apparatus in this embodiment operates basically in the same flow as that shown in FIG. 7; Only a difference from the flow shown in FIG. 7 is the operation shown in FIG. 26 added to step 9. Consequently, other operations in other steps are the same as those described in the second embodiment, so that the description will be omitted here.

Figure 26:
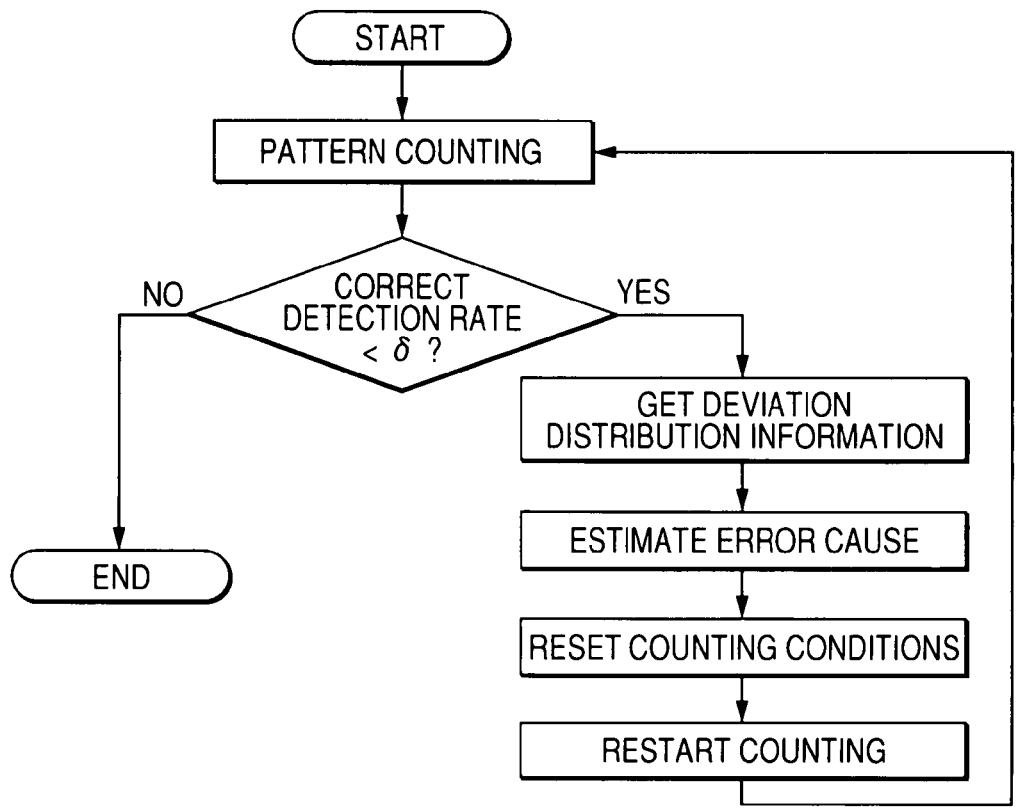
FIG. 26 is a diagram for describing the features of a flowchart of the operation of the charged particle beam application apparatus in the fourth embodiment.

FIG. 26 shows an execution flow in determination steps for whether or not the rate of correctly detected patterns is within δ when pattern counting in an array structure image is ended. The threshold value δ is varied among patterns subjected to cell counting, so that the external storage 2521 stores both δ values and ID numbers of specimens (i.e. the lot number) so that they can be referred to mutually.

In case where the rate of correctly detected patterns is less than the threshold value, the computer 2520 estimates the cause of the error. This estimation is made in a step of obtaining the distribution information of a deviation between a detection estimating area and a pattern detected position and a step of estimating the error cause. The deviation distribution information is obtained by referring to the two-dimensional distribution data stored in the external storage 2521 to read the oversight/wrong detection occurred position coordinate information, as well as both starting and ending points in the subject FOV. Just like the second embodiment, if many oversights and wrong detection occur particularly, the frequency of oversights and wrong detection, as well as similar information are displayed on a screen. A threshold value for determining whether to display those information items on a screen is stored in the memory and external storage 2521 provided in the computer 2520 respectively. If the threshold value is exceeded, the image data of the cell counted area is displayed on the display device. Because a pattern of an area in which many oversights and wrong detection occur can be checked on a real image, the usability of the operation of the apparatus is improved.

Next, principles for identifying an error occurrence cause from deviation distribution information will be described with reference to FIG. 27. In FIGS. 22 through 24, the following error causes are shown.
(1) There are many distortions and foreign matters detected in an obtained array structure image.
(2) Improper setting of unit vectors
(3) A starting point of cell counting is displaced.

Figure 27:
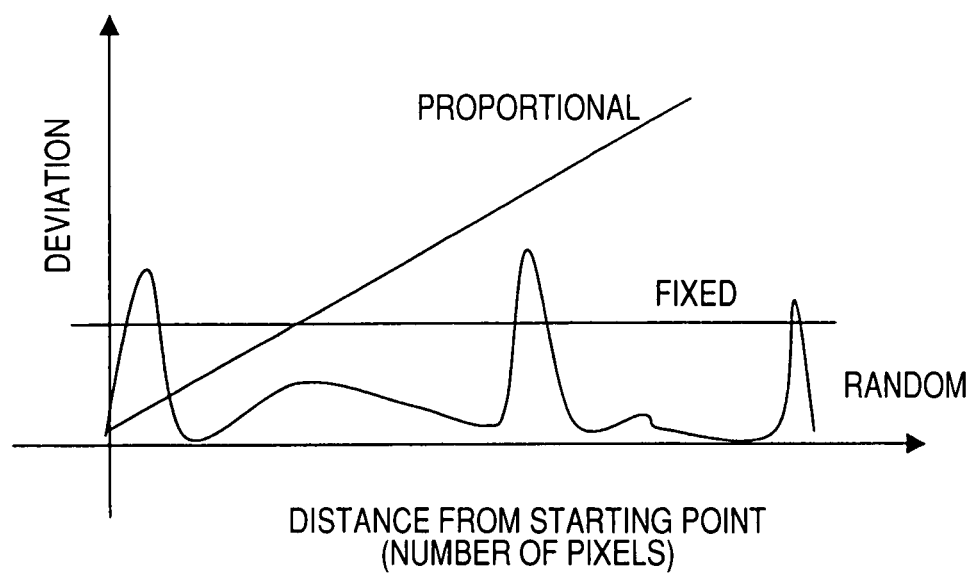
FIG. 27 is a diagram for describing a relationship between deviation distribution and error causes.

In any of the above cases, it is estimated that the number of oversights and wrong detection are distributed as shown in FIG. 27 with respect to a distance from a starting point of cell counting (a distance from the starting point of positional coordinates of executed pattern matching, represented by the number of pixels).

For example, if there are many distortions and foreign matters detected in obtained two-dimensional distribution data, the distribution becomes completely at random with respect to the distance from the starting point, since the number of oversights and wrong detection do not depend on the occurrence position. If a unit vector is improper, the distortion increases in proportion linearly to the distance from the starting point. In addition, if displacement depends on starting points of cell counting, the frequency of occurrence is almost fixed with respect to the distance from the subject starting point, since cell counting advances while the displacement from the center of the reference pattern is left as is. Consequently, each error cause can be identified by calculating how much the frequency of oversight and wrong detection occurrence depends on the distance from the subject starting point and by determining the error type. Such an identification step is executed when the operating means in the computer 2520 applies actually a proper fitting curve to the displacement distribution. When such an error cause is identified, counting conditions are reset and cell counting is restarted.

Next, the counting conditions resetting procedure for restarting cell counting will be described.

At first, if the rate of distortions, foreign matters, oversights, and wrong detections is high, the array structure image photographing conditions (magnification, fetching time, etc.), the reference pattern setting conditions (shape, size, etc.), and pattern matching image processing conditions (threshold value, etc.) are reset. In such a case, when the error cause estimating step is ended, control goes back to step 4 or 9 shown in FIG. 7 to restart the processing.

Figure 28A:
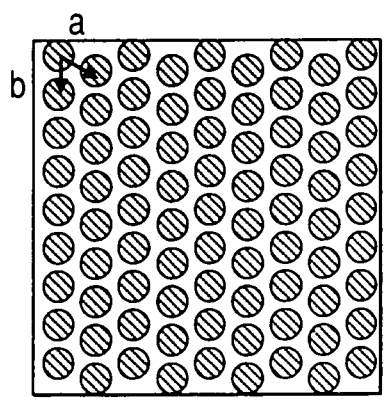
FIG. 28 is a diagram displayed on an improper unit vector correcting screen.
Figure 28B:
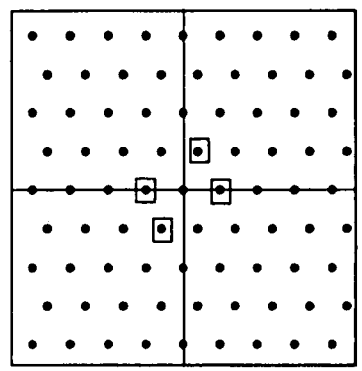

If a unit vector is improper, the display screen of the user interface 2530 is switched over to the unit vector correcting screen, thereby the drawings shown in FIGS. 2A and 2B, as well as the unit vector resetting request are displayed on the correcting screen. Hereinafter, the correcting procedure for the resetting will be described with reference to FIGS. 28A and 28B. In the Fourier conversion image (FIG. 28B) of the array structure image (FIG. 28A) are generated various peaks corresponding to the array structure periodicity. Thus a peak is selected from among those peaks. The selected peak is the closest one to the position of a peak calculated from the initial value of the unit vector. A unit vector calculated from the center of the selected peak is determined as a corrected unit vector. The self correlation image of the subject array structure image may also be used to correct the unit vector. Also in this case, among the peaks to appear in the self correlation image, a peak is selected and the selected peak is the closest one to the position of a peak calculated form the initial value of the unit vector. Then, a unit vector calculated from the center of the selected peak is determined as a corrected unit vector. If the user resets the unit vector in the above procedure, the charged particle beam application apparatus restarts cell counting according to the reset unit vector.

If a starting point of cell counting is displaced, the starting point is corrected in the following procedure. At first, an average displacement between the center of the detection estimating area and the detected position is calculated in the position of the correct detection and the result is assumed as a displacement value of the starting point. Then, according to the calculated displacement, the starting point in the n-th array structure image is corrected.

If a lower magnification and a shorter fetching time are set for the array structure image photographing conditions, the pattern counting time can be reduced. In that case, however, the detection result becomes unstable due to the image SN lowering. If a plurality of patterns is included in the reference pattern, the variation of the patterns is averaged, thereby the detection result is stabilized. In that case, however, the analyzing time increases. The shape of the reference pattern can be selected from any of squares, rectangles, circles, etc., so that it should be optimized appropriately to the subject specimen. If the reference pattern is machined properly, the detection results may be stabilized in some cases. For example, a plurality of patterns are removed from the subject array structure image and those patterns are added up and averaged to obtain a reference pattern. Then, the reference pattern is masked properly to extract only an area to be subjected to pattern matching. As for image processings, in the case of the mutual correlation method and the least square method, a threshold value matching with the reference pattern should be optimized in accordance with the subject image. And those conditions are optimized to improve the rate of correct detection of patterns.

While a description has been made for an operation flow of the charged particle beam application apparatus in this embodiment, the error cause estimating step and the counting conditions resetting step shown in FIG. 26 may be executed during or after cell counting. If software corresponding to both of those operation modes is built in the computer 2520 or external storage device 2521 beforehand so that the user can select either of the modes (e.g., a request for selecting either of the operation modes is displayed on the user interface 2530 before starting the flow shown in FIG. 26), the operability of the charged particle beam application apparatus will be improved.

As for image processings, in addition to pattern matching, image processings are needed to measure the moving distance of the whole array structure image. If there is no error in the specimen stage position setting, the same visual field is photographed both before and after the specimen stage movement. However, because there is an error in the specimen stage position setting usually, a visual field deviation comes to occur. If this visual field deviation is assumed to be larger than the subject unit vector, it cannot be measured in pattern matching. This is why the present invention has employed a visual field analyzing method that uses phase difference calculation. This method is characterized in that only the same patterns are detected without detecting similar patterns. Thus it is possible to analyze a visual field deviation even between array structure images having a larger visual field deviation respectively than the subject unit vector.

Figure 29:
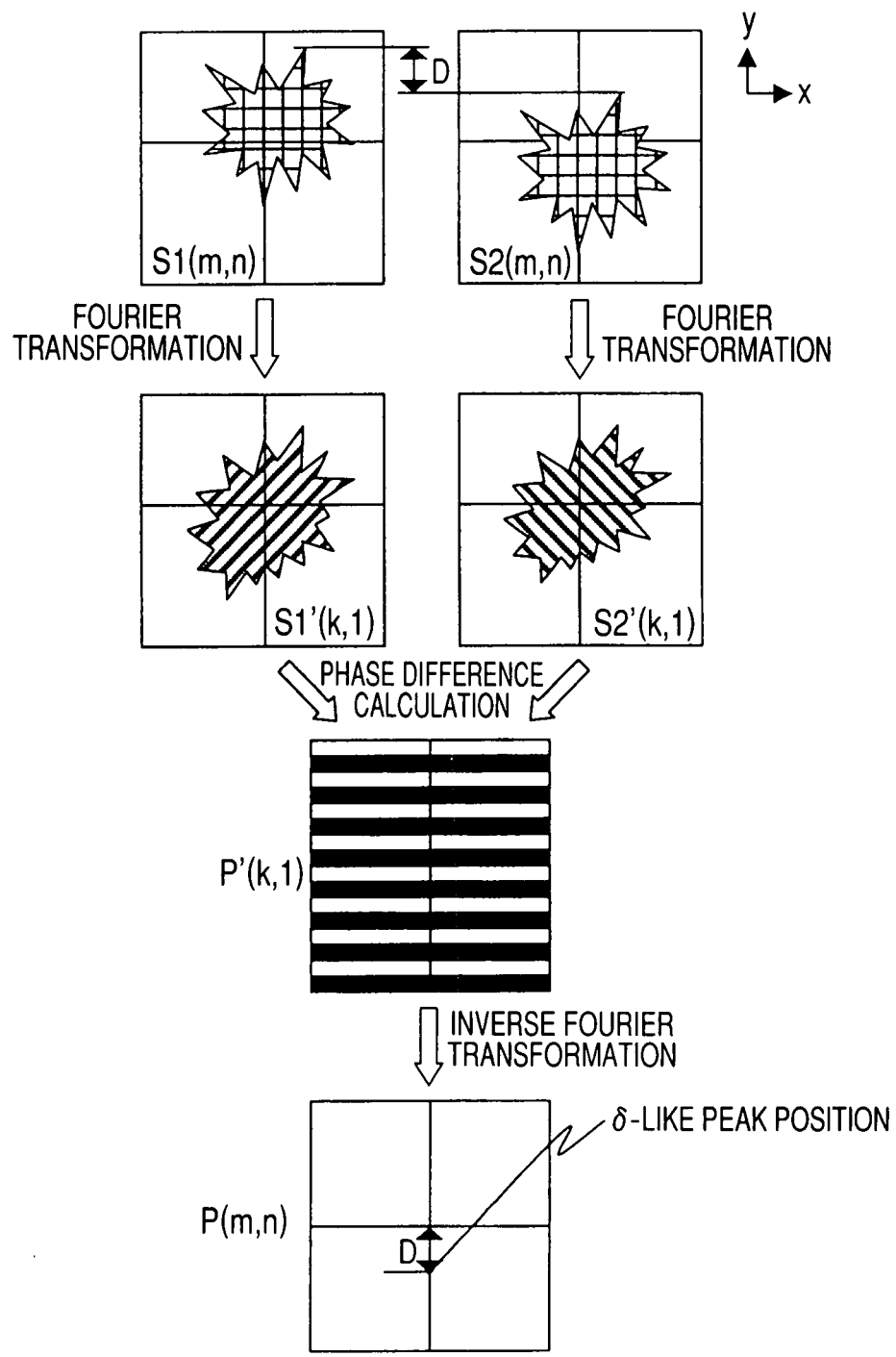
FIG. 29 is a diagram for describing a visual field analyzing method in this embodiment.

Here, the visual field deviation analyzing method employed this time will be described with reference to FIG. 29. Assume now that there are two discrete images S1 (n, m) and S2 (n, m) with a visual field deviation D=(Dx, Dy) therebetween. At this time, S1 (n, m)=S2 (n+Dx, m+Dy) is satisfied. The result of the two-dimensional discrete Fourier conversion of the S1 (n, m) and S2 (n, m) is described as S1' (k, i) and S2' (k, i). Because there is a formula F{S(n+Dx), m+Dy}}}=F{S(n, m)}exp(iDx·k+iDy·l) for the Fourier conversion, the converted result can be varied to S1'(k, l)=S2' (k, l)exp(iDx·k+iDy·l). In other words, the visual field deviation between S1'(k, l) and S2'(k, l) is represented by a phase difference exp (iDx·k+iDy·l)=P'(k, l). Because P'(k, l) is also a wave of which cycle is (Dx, Dy), a peak like δ appears at the position of (Dx,Dy) in an analyzed image P(n,m) obtained by applying inverse Fourier conversion to the phase difference image P' (k, l). At this time, the amplitude information is not removed completely; a log or √ processing is applied to the amplitude content of the S1' (k, l)·S2 (k, l)*=|S1'||S2'|exp (iDx·k+iDy·l) to calculate an image in which the amplitude content is suppressed. And even when inverse Fourier conversion is applied to the image, a peak like δ appears at the position (Dx, Dy) of the visual field deviated vector, so that visual field deviation analysis may be done for the image. Because a peak like appears at (−Dx, −Dy) even when Fourier conversion is applied to the phase difference image P' (k, l), visual field deviation analysis may be done for an image obtained by applying Fourier conversion to the phase difference image P' (k, l). And because it is assumed that only a peak like δ exists in the analyzed image P (n, m), the position of the peak like δ can be obtained accurately down to the decimal point through calculation of a center of gravity or function fitting. And because all the contents other than the δ-like peak can be regarded as noise, it is possible to assume the rate of the δ-like peak intensity to the intensity of the whole analyzed image P (n. m) as a consistency degree. The upper/lower limit value used for determination of such a consistency degree is stored in the external storage device 2521 or computer 2520.

In the case of the conventional visual field deviation analyzing method, it is difficult to evaluate the reliability of visual field deviation analysis results and frequency contents required for analysis are insufficient. As a result, even wrong visual field deviation output is used for an analysis/calibration flow as is. However, employment of the visual field deviation analyzing method described above enables the lower limit of consistency degree to be set and images to be photographed again automatically if the consistency degree is under the lower limit.

The photographing conditions should be varied between the array structure image to be analyzed for visual field deviation and the array structure image used for counting the number of patterns. The array structure image used for counting the number of patterns should preferably be photographed at a low magnification to reduce the counting time while the array structure image to be analyzed for visual field deviation should preferably be photographed at a rather high magnification so as to enable differences among individual patterns to be observed. Whether or not analysis is possible depends on the visual field deviation between images. The more the visual field deviation increases, the more the visual field common among images decreases, thereby the analysis becomes difficult. If the analyzable visual field deviation becomes smaller than the stage position setting accuracy, a plurality of array structure images of which visual fields are shifted with use of the image shifting deflector are photographed after the specimen stage is moved. Then, the specimen stage position setting error is analyzed.

The photographing conditions of an array structure image used for analyzing its visual field deviation are optimized as follows. At first, a visual field analysis is executed between the array structure image 1202 photographed before specimen stage movement and the array structure image 1203 photographed by shifting its visual field with use of the image shifting deflector. At that time, the visual field deviation should be within the error of the specimen stage position setting or so. If the subject visual field deviation cannot be analyzed, the photographing conditions and the visual field deviation are changed and they are verified again.

After the photographing conditions for the array structure image used for analyzing the visual field deviation are determined, the array structure image 1202 (FIG. 12A) before the specimen stage movement is photographed. Then, the control value of the image shifting deflector is changed and the specimen stage is moved to cancel the visual field movement with the control value. After that, the array structure image 1205 (FIG. 12B) after the specimen stage movement is photographed. Then, the visual field deviation from the array structure image 1202 before the stage movement is analyzed to find a specimen stage position setting error, then the error is corrected. This error correction may be done by moving the visual field with use of the image shifting deflector or by correcting the detection estimating area in the array structure image photographed after the specimen stage movement.

In addition to the visual field deviation between images, differences may be found in rotation and reduced scale due to the distortion around an electromagnetic field lens. In such a case, the visual field deviation/rotation/reduced scale analyzing method should preferably be employed, since the method can analyze both rotation and reduced scale together with the visual field deviation between images. In addition, the filter/parameter can be adjusted so as to detect only the same patterns without detecting similar patterns. In this case, however, the adjustment is required for each image and how to make such an adjustment must also be know beforehand.

As described above, the charged particle beam application apparatus in this embodiment can correct cell counting errors to improve the accuracy of cell counting more than any of conventional techniques. And the error correcting function described above can apply to the apparatus described in any of the second and third embodiments, as well as to general charged particle beam apparatuses.

According to the present invention, therefore, it is possible to identify defect positions in a memory very accurately, quickly, and stably, although it has been difficult conventionally. In addition, because the TAT of the defect position transmission in both inspection and analyzing apparatuses is improved significantly, the defect analyzing TAT in process development is improved.

What is claimed is:

1. A charged particle beam apparatus, including:
   a function for detecting secondary charged particles generated from a specimen illuminated by a charged particle beam;
   a charged particle optical system for obtaining image data;
   a function for counting the number of predetermined patterns that appear between a specific starting point and an ending point on said image data,
   counting means for counting the number of said predetermined patterns with respect to said image data;
   information inputting means for setting a unit vector for specifying a coordinate system to represent said starting point and an address of said ending point, the unit vector being for setting a detection estimating area of said specimen;
   a calculating device which executes pattern matching between said image data in said detection estimating area and said predetermined pattern; and
   displaying means for displaying said image data,
   wherein said counting means counts the number of said predetermined patterns according to said unit vector,
   said calculating device sets a detection estimating area in a predetermined range that is an integer multiple of said unit vector, and
   said calculating device calculates a number of patterns for which there is no pattern matching with said predetermined pattern in said detection estimating area, and a number of patterns for which there is pattern matching with said predetermined pattern in said detection estimating area.

2. The apparatus according to claim 1,
wherein a moving direction for counting each of said predetermined patterns is determined according to said unit vector.

3. The apparatus according to claim 1,
wherein said image data and said unit vector are displayed together on said displaying means.

4. The apparatus according to claim 3,
wherein an additional line that is an extended line of said unit vector and said image data are displayed together on said displaying means.

5. The apparatus according to claim 1,
wherein said specimen is a semiconductor specimen on which a circuit pattern or wiring pattern is formed; and
wherein said apparatus includes a CAD system for storing layout data used to specify said starting point and an address of said ending point according to said circuit or wiring pattern design data.

6. The apparatus according to claim 1,
wherein said calculating device counts the number of patterns when there is pattern matching with said predetermined pattern in said detection estimating area.

7. The apparatus according to claim 6,
wherein said apparatus further includes storage means for storing a threshold value used to determine whether the number of said predetermined patterns which are counted by the calculating device is satisfied or not; and
wherein said calculating device, when the number of said predetermined patterns does not satisfy said threshold value, executes error processing.

8. The apparatus according to claim 6,
wherein said counting means, when the number of said predetermined patterns does not satisfy said threshold value, displays a request for resetting the conditions for counting the number of said predetermined patterns on said displaying means.

9. The apparatus according to claim 7,
wherein said counting device executes error processing according to a distribution of said predetermined patterns in said detection estimating area.

* * * * *